United States Patent
Kamoi et al.

[11] Patent Number: 5,280,483
[45] Date of Patent: Jan. 18, 1994

[54] TRAFFIC CONTROL SYSTEM FOR ASYNCHRONOUS TRANSFER MODE EXCHANGE

[75] Inventors: Jyoei Kamoi, Kawasaki; Hichiro Hayami; Yuji Kato, both of Yokohama; Toshio Shimoe, Hatano; Shunji Abe, Yokohama; Michio Kusayanagi, Tokyo; Haruo Mukai, Tokyo; Toshio Soumiya, Yokohama, all of Japan

[73] Assignee: Fujitsu Limited, Kawasaki, Japan

[21] Appl. No.: 742,758

[22] Filed: Aug. 9, 1991

[30] Foreign Application Priority Data

| Aug. 9, 1990 | [JP] | Japan | 2-209153 |
| Aug. 30, 1990 | [JP] | Japan | 2-226491 |
| Nov. 13, 1990 | [JP] | Japan | 2-306734 |

[51] Int. Cl.⁵ .............................................. H04J 3/14
[52] U.S. Cl. ..................................... 370/94.1; 370/60; 370/84
[58] Field of Search ....................... 370/94.1, 60, 84

[56] References Cited

U.S. PATENT DOCUMENTS

| 4,912,702 | 3/1990 | Verbiest | 370/94.1 X |
| 4,984,264 | 1/1991 | Katsube | 370/60 X |
| 5,020,052 | 5/1991 | DePrycker et al. | 370/94.1 X |
| 5,020,055 | 5/1991 | May, Jr. | 370/94.1 |
| 5,070,498 | 12/1991 | Kakuma et al. | 370/60 |
| 5,166,894 | 11/1992 | Saito | 370/94.1 X |

Primary Examiner—Douglas W. Olms
Assistant Examiner—Russell Blum
Attorney, Agent, or Firm—Staas & Halsey

[57] ABSTRACT

A call admission control system in an asynchronous transfer mode exchange includes a unit for describing attribute parameters of a call from the subscriber terminal; a unit for calculating, based on the attribute parameters, the average and the dispersion of the traffic speeds of the call; a unit for managing data of the average and the dispersion on each output route and data relating to each subscriber; and a unit for calculating the total average and the total dispersion of the data speeds on the selected output route; and a unit for calculating prediction values of cell abandon rate and end-to-end delay based on the average and the dispersion on the selected output route calculated by the total average and dispersion calculating unit, and for comparing the prediction values with the required service quality of cell discard rate and end-to-end delay, for determining whether or not the requesting call may be connected.

21 Claims, 34 Drawing Sheets

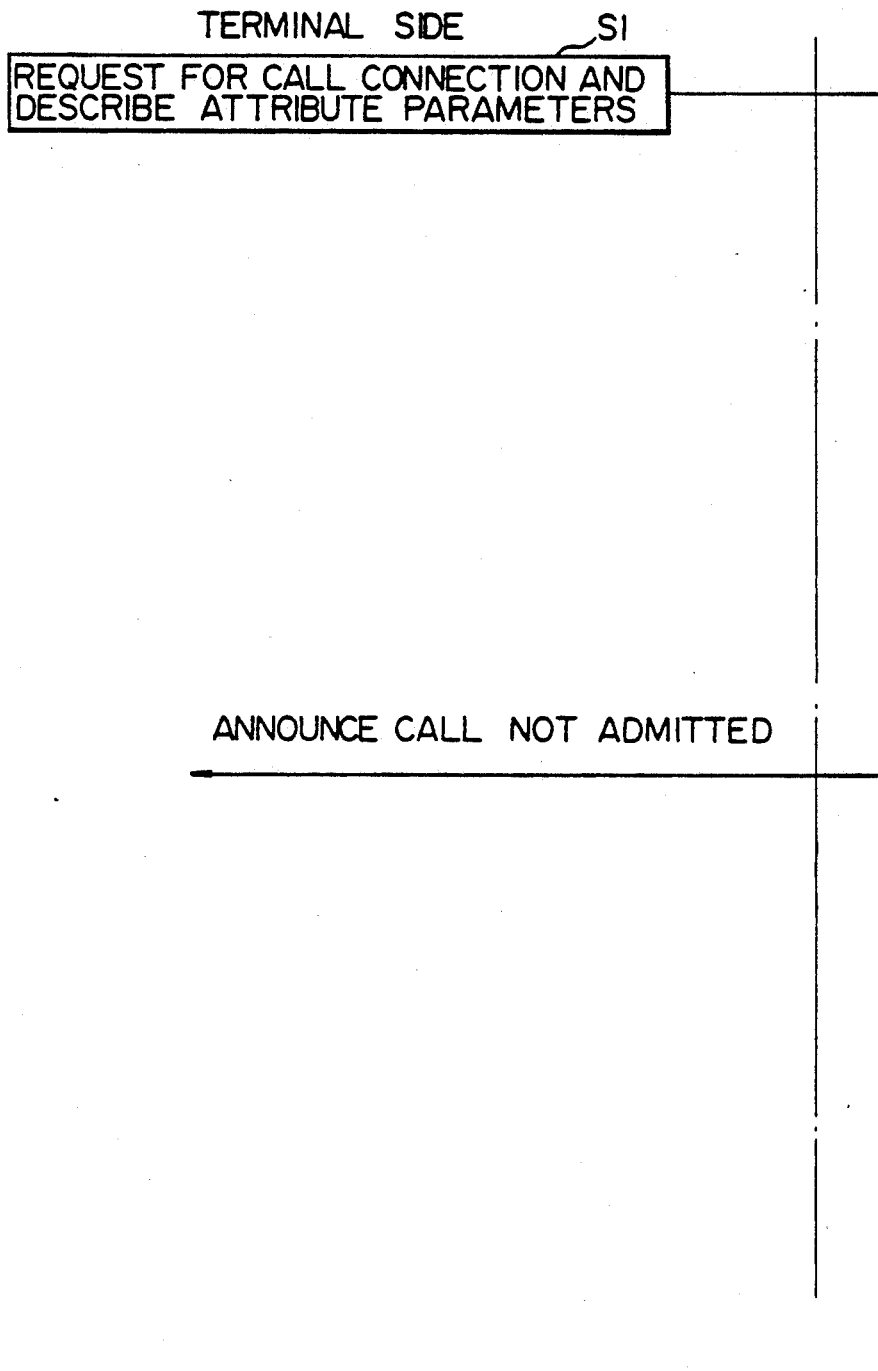

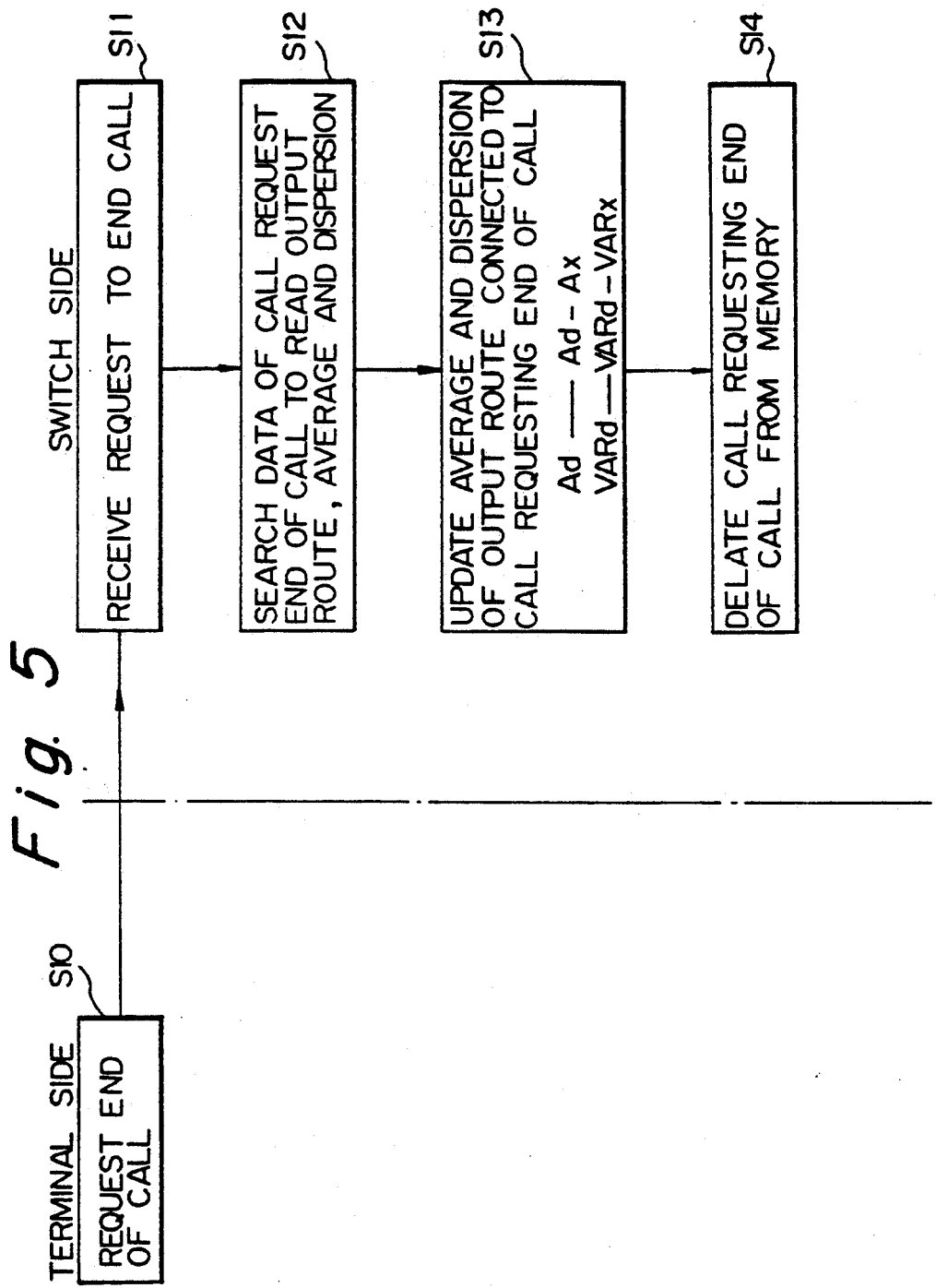

Fig. 6

| | | |
|---|---|---|
| 0000 | SUBSCRIBER LOCATION NUMBER | ↑ |
| 0001 | CALL NUMBER | |
| 0002 | OUTPUT ROUTE NUMBER TO BE CONNECTED | FOR ONE SUBSCRIBER |
| 0003 | AVERAGE | |
| 0004 | DISPERSION | ↓ |
| 0005 | SUBSCRIBER LOCATION NUMBER | |
| 0006 | CALL NUMBER | |
| 0007 | OUTPUT ROUTE NUMBER TO BE CONNECTED | |
| 0008 | AVERAGE | |
| 0009 | DISPERSION | |
| 000A | SUBSCRIBER LOCATION NUMBER | |
| 000B | CALL NUMBER | |

Fig. 7

| | | |
|---|---|---|
| 0000 | OUTPUT ROUTE NUMBER | ↑ |
| 0001 | AVERAGE | DATA FOR ONE OUTPUT ROUTE |
| 0002 | DISPERSION | ↓ |
| 0003 | OUTPUT ROUTE NUMBER | |
| 0004 | AVERAGE | |
| 0005 | DISPERSION | |
| 0006 | OUTPUT ROUTE NUMBER | |

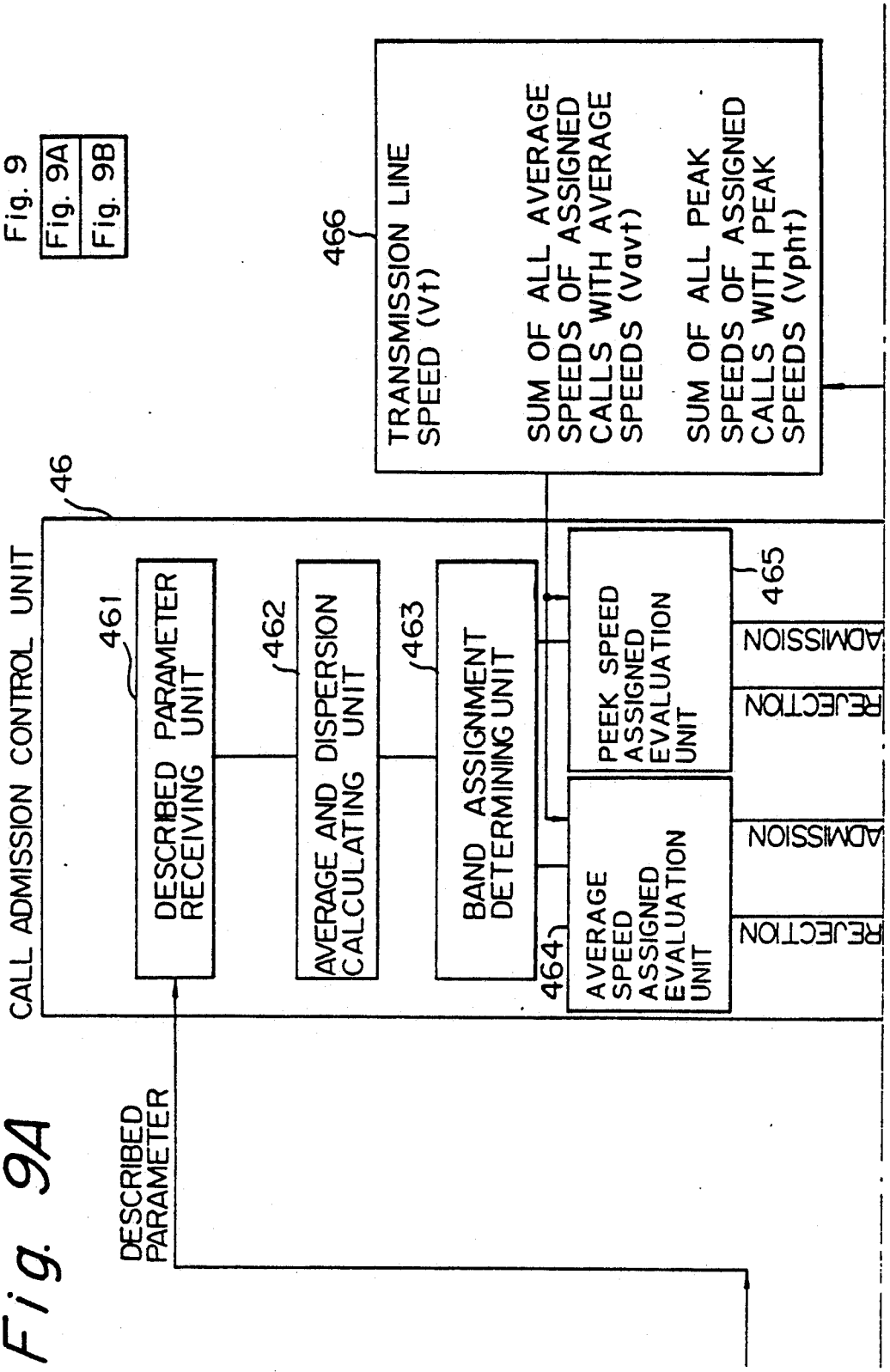

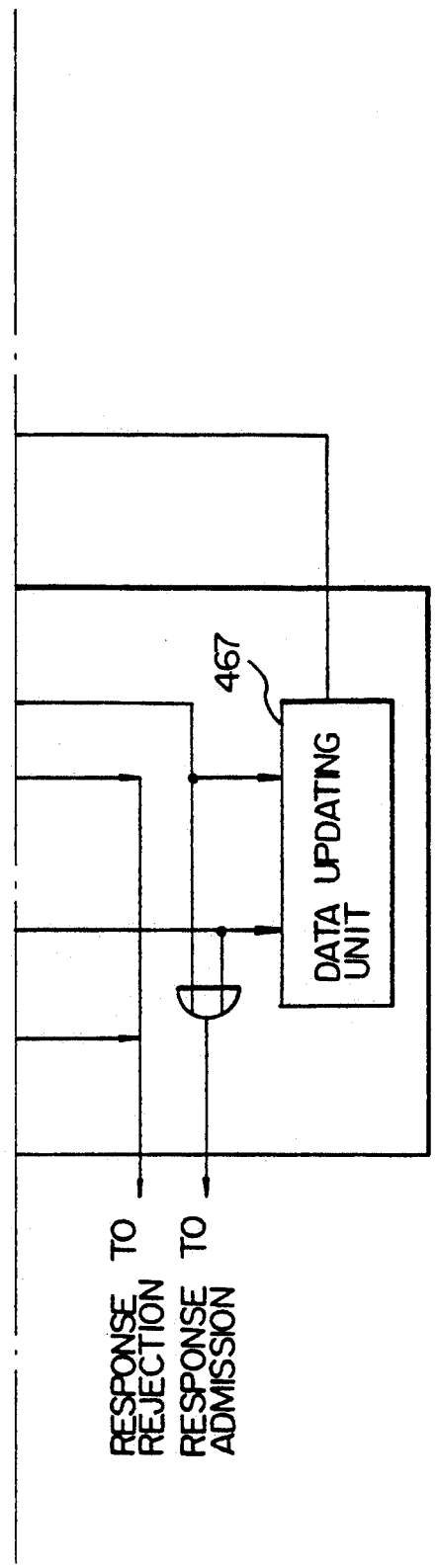

Fig. 19

| | | |
|---|---|---|
| 0000 | SUBSCRIBER LOCATION NUMBER | |
| 0001 | CALL NUMBER | |
| 0002 | OUTPUT ROUTE NUMBER TO BE CONNECTED | FOR ONE SUBSCRIBER |
| 0003 | AVERAGE OF REQUESTED BAND | |
| 0004 | DISPERSION OF REQUESTED BAND | |
| 0005 | SUBSCRIBER LOCATION NUMBER | |
| 0006 | CALL NUMBER | |
| 0007 | OUTPUT ROUTE NUMBER TO BE CONNECTED | |
| 0008 | AVERAGE OF REQUESTED BAND | |
| 0009 | DISPERSION OF REQUESTED BAND | |
| 000A | SUBSCRIBER LOCATION NUMBER | |
| 000B | CALL NUMBER | |

Fig. 20

| | | |
|---|---|---|
| 0000 | OUTPUT ROUTE NUMBER | |
| 0001 | AVERAGE OF COMMUNICATING BAND | DATA FOR ONE OUTPUT ROUTE |
| 0002 | DISPERSION OF COMMUNICATING BAND | |
| 0003 | OUTPUT ROUTE NUMBER | |
| 0004 | AVERAGE OF COMMUNICATION BAND | |
| 0005 | DISPERSION OF COMMUNICATION BAND | |
| 0006 | OUTPUT ROUTE NUMBER | |

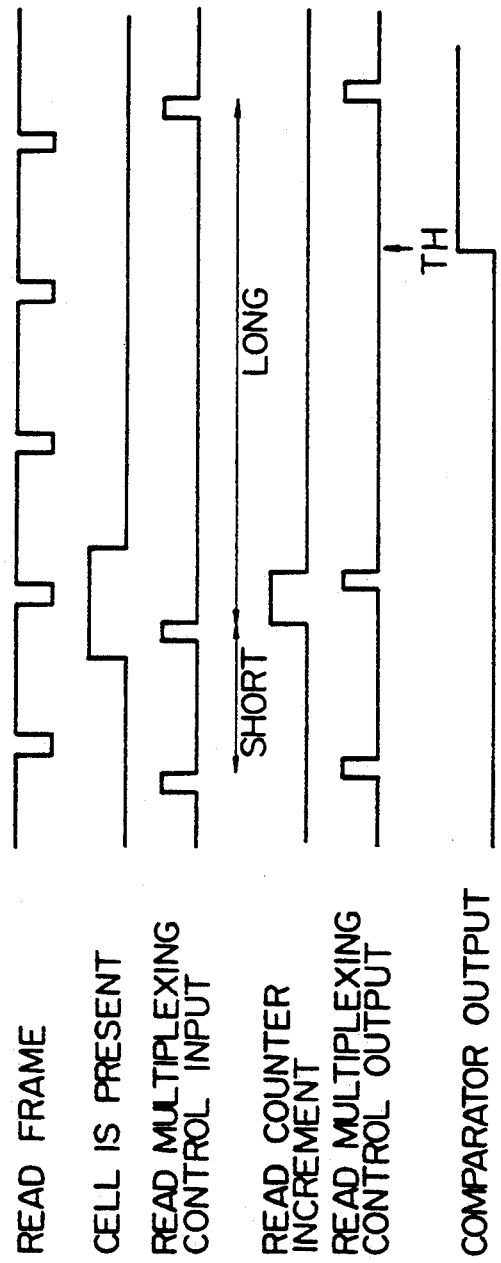

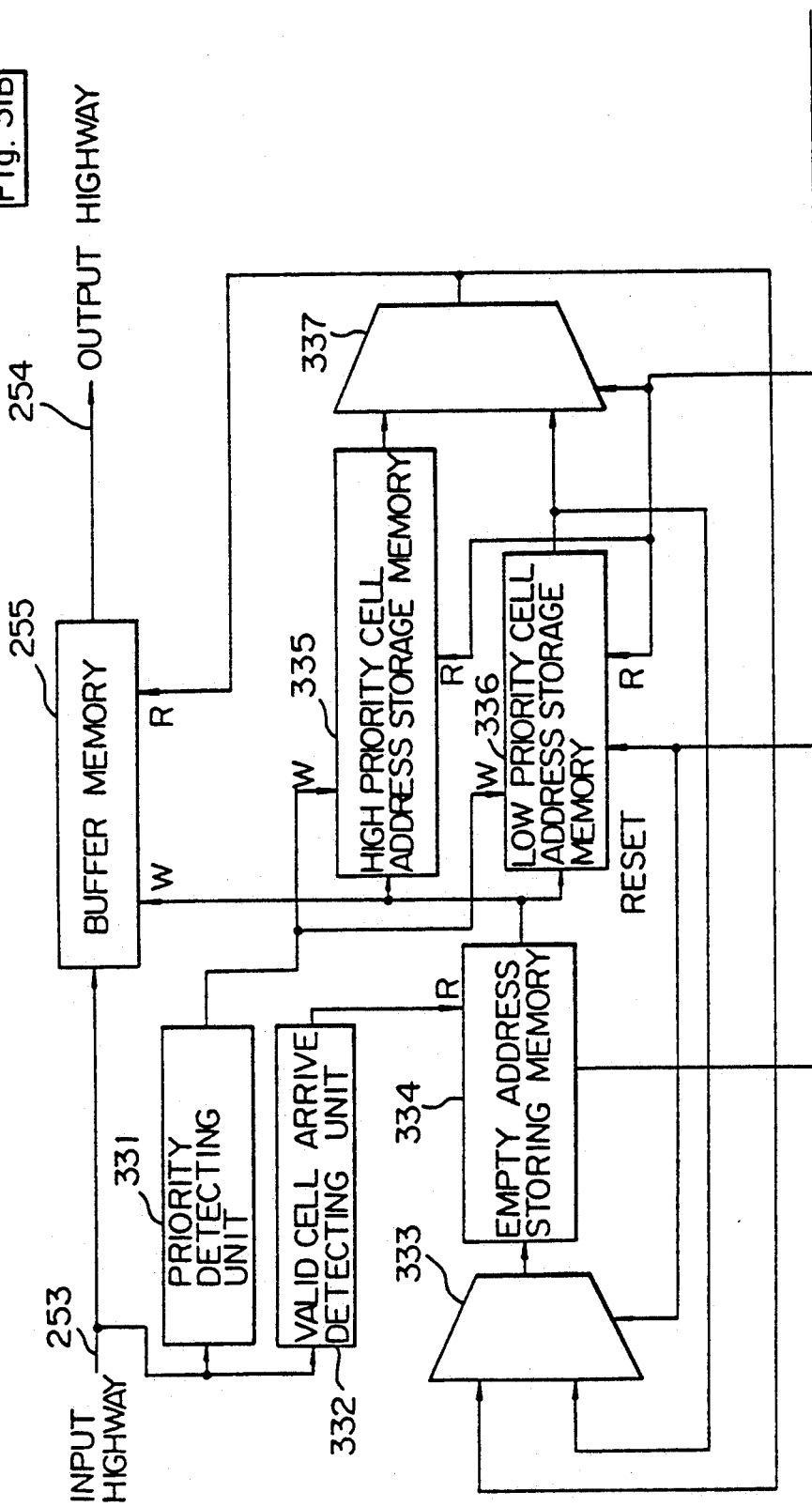

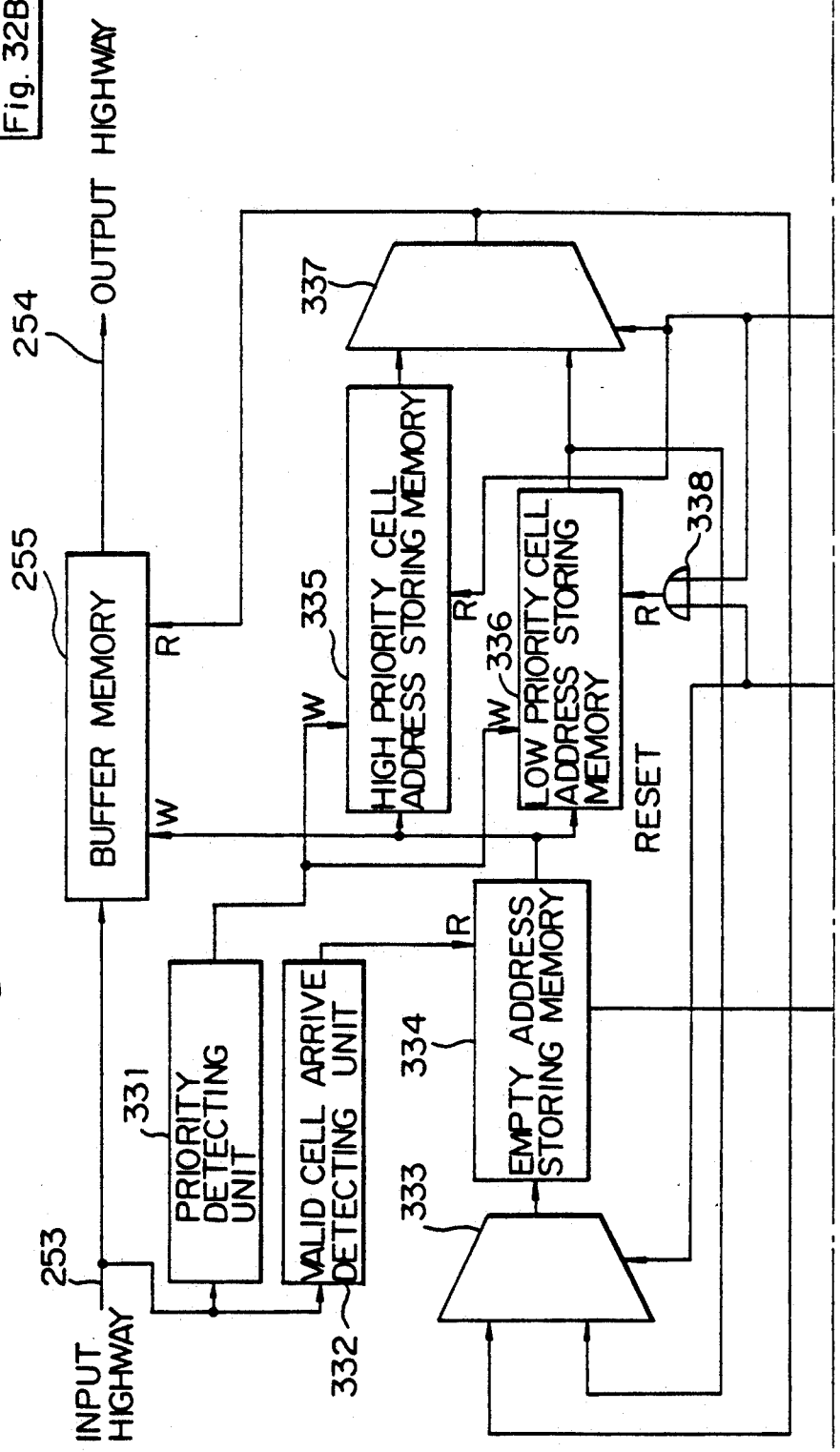

TRAFFIC CONTROL SYSTEM FOR ASYNCHRONOUS TRANSFER MODE EXCHANGE

BACKGROUND OF THE INVENTION

1. Field of the Invention

The present invention relates to a traffic control system for an asynchronous transfer mode (ATM) exchange which receives a description of parameters of traffic upon reception of a request-to-call connection from one calling subscriber terminal to another subscriber terminal.

Research and development for broad band integrated service digital networks (ISDN) have progressed to the point of providing a next generation communication network for a total communication service covering all ranges including voice, data, full motion video, and so forth. ATM is a technology for converting all data into cells with fixed packet length and for transferring the cells at a high speed, regardless of whether the data is continuous data such as a moving picture or the data is burst data, or without depending on the occurrence of the data or on the communication speed of the data.

In the ATM communication, however, because it handles, in an integrated form, voice, data, full motion video and so forth having a different bearer rate and burst characteristics, when traffic having strong burst characteristics exits, i.e., when the interval between continuous data sets varies, the variation of traffic in the communication route becomes large or, in other words, the dispersion of the communication speeds becomes large, thereby causing a discard of cells or delays which degrade the service quality. Therefore, a solution to this problem has been desired.

2. Description of the Related Art

ATM communication is performed by inserting a fixed length (53 bytes) packet, which is referred to as a cell, into a vacant time slot. The actual transfer speed may be changed by increasing or decreasing the number of cells. Each cell is constituted by a header and data. The header contains information such as the address of the destination.

As mentioned above, various types of information are transmitted through the ATM network. Namely, information requiring a high transfer speed (in case of full motion video, near 100 Mbps, where "bps" is bit per second) and information at low speed, such as voice, are multiplexed on the same transmission line and are transmitted. Therefore, various facilities can be employed as terminals and the respective characteristics thereof are different. The nature of the set-up calls may be one generating continuous information such as voice, or one intermittently generating information having strong burst characteristics, such as video, data, and so forth. These data are handled in an integrated form. Therefore, when traffic having strong burst characteristics is mixed in the communicating data, it becomes important to maintain the quality of service such as the cell loss rate or an end-to-end delay as required by the users.

An actual prior art of ATM communication cannot be presented because the ATM communication per se is a new technology, but it can be considered to use conventional traffic control technologies employed in the conventional circuit exchange and synchronous type packet exchange. Namely, in the case of a circuit exchange, a judgement is made whether or not the line is occupied by some subscribers. A call is rejected when the line is occupied by some subscribers and is accepted when the line is empty. On the other hand, in case of packet exchange, a judgement is made whether or not there is an empty (i.e., unused) capacity or vacancy, in the output route of the transmission line so as to allow communication when there is a vacancy.

On the other hand, there is a proposal in that, as a traffic control system in an ATM communication, once a call, which is requesting a call connection, is accepted, and when the communication is not performed in accordance with the parameters such as the peak speed described by the user, marking is provided on a part of the header for a cell which enters, with a band width (bit rate or speed) beyond the described band width, into a supervisory unit having a policing function. Then, if congestion occurs, the cell with the marking is discarded (see Electronic Communication Society Technical Study Material, SE87-137, P43-48).

In applying the technology of a packet switching system to ATM communication, one approach would be to accept a call when the sum of peak bands (peak speeds) of data described by calls can pass through the communication path. However, in such an approach, since other parameters of the call such as the average speed, burst period, idle period between bursts, and burst ratio are not considered in the call admission control, it is difficult to reduce the cell loss rate.

For example, when a call, which is requesting a call connection and has a high speed and strong burst characteristics, is accepted, and when a number of cells are set up at the same time, the total band width of one highway may become larger that the transmission ability, i.e., the transmission capacity, although it depends on characteristics such as the burst characteristics or the transmitting speeds of the calls which have been transferred through the same highway. In such case, cells of the requesting call are discarded without being transferred. Although such discarding of the cells can be avoided by expanding the capacity of the buffer in the network, it may, in turn, cause a delay which is undesirable for information, such as voice information, requiring real-time communication.

Conventionally, there is a problem in that it is difficult to accurately judge whether or not the required service quality such as the cell loss rate or delay can be maintained, upon admission of a call. Furthermore, there is a problem in that, once a call is accepted, it is difficult to maintain a predetermined level of service quality when congestion is caused by, for example, a call which has parameters beyond the described parameters.

On the other hand, according to the conventional method, in which the marking is put for a breaching cell which is transferred in the ATM switching system with a band width greater that the described band width after accepting the call, and the marked cells are discarded when congestion occurs, there is a problem in that the discard of cells may have a serious effect when the cells are for data transmission and so forth.

SUMMARY OF THE INVENTION

It is, therefore, an object of the present invention to provide a traffic control system for an ATM switching system which can make an accurate judgement upon reception of a call as to whether or not the service quality, for parameters of a call described by the calling subscriber, can be maintained and which can maintain the described service quality during a transfer operation once the call is accepted.

Another object of the present invention is to provide a call admission control system in an ATM exchange which can reject a call when it is anticipated that a required service quality cannot be provided, by calculating an average and a dispersion of band widths of a call which is requesting a call connection.

Still another object of the present invention is to provide a congestion control system for an ATM switching system in which the amount of hardware is reduced and the read out control is simplified.

It should be noted that, throughout the specification, the term "band width", "speed", and "bit rate" of a call have the same meaning.

To attain the above objects, there is provided, according to the present invention, a call admission control system in an asynchronous transfer mode exchange for converting input data from a subscriber terminal into cells, each with data of a fixed length, and for statistically multiplexing and exchanging the cells to output to an output route. The call admission control system comprises an attribute parameter description unit for describing attribute parameters of a call from the subscriber terminal upon occurrence of a request for connection of the call from the subscriber terminal to another terminal; an average and a dispersion calculating unit for calculating, based on the attribute parameters described by the attribute parameter description unit, an average and a dispersion of the traffic speeds of the data in the call; a data managing unit for storing and managing data of the average and dispersion on each output route and data relating to each subscriber; a total average and total dispersion calculating unit for calculating a total average and a total dispersion of the data speeds on the output route selected by the asynchronous transfer mode exchange, when the call which is requesting the connection is added to the existing calls, based on the average and the dispersion of the added call calculated by the average and dispersion calculating unit, and the average and the dispersion of the existing calls on the selected output route managed by the data managing unit; and a cell loss rate and end-to-end delay evaluation unit, operatively connected to the total average and total dispersion calculating unit, for calculating prediction values of cell loss rate and end-to-end delay based on the average and dispersion on the selected output route calculated by the total average and dispersion calculating unit, and for comparing the prediction values with the required service quality of cell loss rate and the required end-to-end delay for determining whether or not the call which is requesting the connection may be connected.

The attribute parameters described by the attribute parameter description unit are any three or more parameters, among the parameters of a peak speed, an average speed, a burst period, an idle period between bursts, a number of cells during the burst period, and a burst ratio, of data from the subscriber terminal which is requesting the call connection.

According to an aspect of the present invention, the average and dispersion calculating unit comprises a unit for calculating the average and dispersion of the data speed in the call which is requesting the call connection based on the three parameters of a peak speed, a burst period, and an idle period between bursts described in the attribute parameter description unit.

According to another aspect of the present invention, the data managing unit is operatively connected to the total average and total dispersion calculating unit and to the cell loss rate and end-to-end delay evaluating unit and stores, while the call is connected to another subscriber terminal, the data of the location of the calling subscriber, a call number of the calling subscriber, an output route number, the average, and the dispersion of the calling subscriber terminal, when the cell loss rate and end-to-end delay evaluating unit decides to accept the call which is requesting the connection.

According to still another aspect of the present invention, the data managing unit is operatively connected to the total average and total dispersion calculating unit and to the cell loss rate and end-to-end delay evaluating unit, for storing the total average and the total dispersion on the output route including the average and the dispersion of the call when a decision is made to accept the call by the cell loss rate and end-to-end delay evaluation unit, and for storing the total average and the total dispersion of the output route from which the average and the dispersion of the call is deleted when the call is ended.

According to still another aspect of the present invention, there is provided a call admission control system in an asynchronous transfer mode exchange which receives a description of parameters of traffic upon reception of a call through a transmission line to another subscriber terminal, comprising: a memory for storing a standard data speed in the transmission line, a sum of peak speeds of all calls with the peak speeds already assigned in the transmission line, and a sum of average speeds of all calls with the average speeds already assigned in the transmission line; a calculating unit for calculating, based on the description of parameters, an average and a dispersion of data speeds of the call which is requesting a call connection through the transmission line; a band assignment determining unit, operatively connected to the memory and to the calculating unit, for determining whether the call with the average speed or the call with the peak speed is to be assigned, based on the calculated values of the average and the dispersion and values stored in the memory; and an assignment evaluation unit, operatively connected to the band assignment determining unit, for determining, in response to the assignment of the call, whether the assigned call may be admitted and transferred.

It is preferable that the attribute parameters be any three or more among parameters of a peak speed Vp, an average speed Vav, a burst period $\alpha^{-1}$, and idle period $\beta^{-1}$ between bursts, a number Nc of cells during the burst period $\alpha^{-1}$, and a burst ratio Rb, of data from the subscriber terminal which is requesting the cell connection, and that the average and dispersion calculating unit comprise a unit for calculating the average a and the dispersion v based on the following equation:

$$a = Vav/Vt$$

$$v = a \times (2Nc - 1) \times (1 - Vav/Vp)$$

where Vt is the regulated speed of the transmission line.

It is also preferable that the attribute parameters described by the subscriber terminal which is requesting the call connection be the average speed Vav, the number of the cells Nc during a burst period, and the peak speed Vp.

It is further preferable that the attribute parameters described by the subscriber terminal which is requesting the call connection be the peak speed Vp, the burst period $\alpha^{-1}$, and the idle period $\beta^{-1}$, the average and the dispersion of the call being calculated by obtaining the number of cells Nc and the average speed Vav from the following equations:

$$Nc = Vp \times \alpha^{-1}/CL$$

$$Vav = Vp \times \alpha^{-1}/(\alpha^{-1} + \beta^{-1})$$

It is further preferable that the attribute parameters described by the subscriber terminal attribute parameters, in turn described by the subscriber terminal which is requesting the call connection, be the average speed Vav, the number Nc of cells generated during a burst period $\alpha^{-1}$, and the burst ratio Rb, the average and the dispersion of the call being calculated by obtaining the number of cells Nc and the average speed Vav from the following equation:

$$Vp = Vav/Rb.$$

It is further preferable that the attribute parameters described by the subscriber terminal which is requesting the call connection be the peak speed Vp, the burst period $\alpha^{-1}$, and the average data speed Vav, the average and the dispersion of the call being calculated by obtaining the number of cells Nc and the average speed Vav from the following equation:

$$Nc = Vp \times \alpha^{-1}/CL$$

where Cl is the cell length.

It is further preferable that the attribute parameters described by the subscriber terminal which is requesting the call connection be the peak speed Vp, the burst period $\alpha^{-1}$, and the burst rate Rb, the average and the dispersion of the call being calculated by obtaining the number of cells Nc and the average speed Vav from the following equation:

$$Vav = (1 - Rb) \times Vp.$$

It is further preferable that the band assignment determining unit comprise a comparison unit for comparing (Vt−Vpht) and X, where Vt is the regulated speed of the transmission line, Vpht is the sum of peak speeds of all calls already assigned with peak speeds, and X is the minimum number of calls possible to be assigned with average speeds, whereby when the value (Vt−Vpht) is larger than or equal to the value X, the call is assigned with the average speed, and when the value (Vt−Vpht) is smaller than the value X, the call is assigned with the peak speed.

It is further preferable that the assignment evaluation unit comprise a first comparing unit for comparing (Vav+Vavt) and (Vt−Vpht)$\rho$max when the call is assigned with the average speed and a second comparing unit for comparing (Vpht+Vp) and (Vt−Vavt)$\rho$max, where Vav is the average speed of the call which is requesting the call connection, Vavt is the sum of average speeds of all calls already assigned with average speeds, Vpht is the sum of peak speeds of all calls already assigned with peak speeds, Vp is the peak speed of the call which is requesting the call connection, and $\rho$max is the maximum utilization ratio of the transmission line, whereby when the band assignment determining unit decides to assign the call with the average speed, the assignment evaluation unit decides to admit the call only when the value Vav+Vavt is smaller than or equal to the value (Vt−Vpht)$\rho$max, and when the band assignment determining unit decides to assign the call with the peak speed, the assignment evaluation unit decides to admit the call only when the value (Vpht+Vp) is smaller than or equal to the value (Vt−Vavt)$\rho$max.

It is further preferable that the band assignment determining unit comprise a comparison unit for comparing (Vt−Vpht) and X, where Vt is the regulated speed of the transmission line, Vpht is the sum of peak speeds of all calls already assigned with peak speeds, and X is the minimum number of calls possible to be assigned with average speeds, whereby when the value (Vt−Vpht) is larger than or equal to the value X, the call is assigned with the average speed, and then the value (Vt−Vpht) is smaller than the value X, the call is assigned with the peak speed.

According to a still further aspect of the present invention, there is provided a call admission control system in an asynchronous transfer mode exchange which receives a description of parameters of traffic upon reception of a call through a transmission line to another subscriber terminal, comprising: an estimating unit for estimating a band width of communication required by the calling subscriber based on the parameters described by the calling subscriber; a managing unit for managing the amount of band width used in the transmission line or the output route; and an admission determining unit, operatively connected to the estimating unit and to the managing unit, for determining whether or not the call should be admitted, under the condition that the call satisfies the communication quality, based on the band width estimated by the estimating unit and the used amount of band width managed by the managing unit.

It is preferable that the estimating unit comprise: a described parameter receiving unit for receiving an average speed Vav and a peak speed Vp of the bandwidth of the calling subscriber; a comparing unit for comparing the ratio of the peak speed $W_{BT}$ of the transmission line and the peak speed Vp of the calling subscriber with a predetermined value X, where X is the minimum number of calls possible to be assigned with an average speed; an average and dispersion estimating unit, operatively connected to the comparing unit, for estimating, when the comparison result is that the ratio $W_{BT}/Vp$ is smaller than the predetermined value X, an average E[Z] and a dispersion V[Z] of the data speed from the calling subscriber by the following equations:

$$E[Z] = Vp \times P_1 + 0 \times (1 - P_1) = Vp \times P_1 = Vav$$
$$V[Z] = (Vp - Vav)^2 \times P_1 + (0 - Vav)^2 \times (1 - P_1)$$
$$= Vav \times (Vp - Vav)$$

where $P_1$ is the probability of ON of the data from the subscriber terminal, and Z is the random variable of the data transmission speed.

It is also preferable that the estimating unit comprise: a described parameter receiving unit for receiving an average speed Vav and a peak speed Vp of the bandwidth of the calling subscriber; a comparing unit for comparing the ratio of the peak speed $W_{BT}$ of the transmission line and the peak speed Vp of the calling subscriber with a predetermined value X, where X is the minimum number of calls possible to be assigned with average speed; an average and dispersion estimating unit, operatively connected to the comparing unit, for estimating, when the comparison result is that the ratio $W_{BT}/V_p$ is smaller than the predetermined value X, an average $m_c$ and a dispersion $\sigma_c^2$ of the transmitting cells per unit time from the calling subscriber terminal by the following equations:

$$m_c = E[N] = E[Z/Cl] = E[Z]/Cl = V_{av}/Cl$$

$$\sigma_c^2 = V[N] = V[Z/Cl] = V[Z]/Cl^2 = V_{av}(V_p - V_{av})/Cl^2$$

where N is the random variable of the number of the transmitted cells, Cl is the cell length, and Z is the random variable of the data transmission speed.

It is further preferable that the managing unit manage the amount of data used in the band width by the average and the dispersion of the communication speed.

It is further preferable that the managing unit manage the amount of data used in the band width by the average and the dispersion of the number of cells per unit time.

It is further preferable that the admission determining unit employ the distribution of all communication speeds in the transmission line or the output route as a Gaussian distribution, and the condition to satisfy the communication quality is the following condition:

$$m_B + PO\sigma_B \leq W_{BT}$$

where $m_B$ is the average of all communicating speeds under communication, PO is the minimum value of P which satisfies the condition:

$$OVF_B \leq 1 - F_1(p)$$

where $OVF_B$ is the probability of the impossibility to enter into the transmission line, and $F_1(P)$ is expressed as follows:

$$F_1(P) = \frac{1}{\sqrt{2\pi}} \int_{-\infty}^{P} \exp(-z^2/2) dz$$

It is further preferable that the band assignment determining unit comprise a comparison unit for comparing $(V_t - V_{pht})$ and X, where $V_t$ is the regulated speed of the transmission line, $V_{pht}$ is the sum of peak speeds of all calls already assigned with peak speeds, and X is the minimum number of calls possible to be assigned with average speeds, whereby when the value $(V_t - V_{pht})$ is larger than or equal to the value X, the call is assigned with the average speed, and when the value $(V_t - V_{pht})$ is smaller than the value X, the call is assigned with the peak speed.

It is further preferable that the assignment evaluation unit comprise a first comparing unit for comparing $(V_{av} + V_{avt})$ and $(V_t - V_{pht})\rho max$ when the call is assigned with the average speed and a second comparing unit for comparing $(V_{pht} + V_p)$ and $(V_t - V_{avt})\rho max$, where $V_{av}$ is the average speed of the call which is requesting the call connection, $V_{avt}$ is the sum of average speeds of all calls already assigned with average speeds, $V_{pht}$ is the sum of peak speeds of all calls already assigned with peak speeds, $V_p$ is the peak speed of the call which is requesting the call connection, and $\rho max$ is the maximum utilization ratio of the transmission line, whereby when the band assignment determining unit decides to assign the call with the average speed, the assignment evaluation unit decides to admit the call only when the value $(V_{av} + V_{avt})$ is smaller than or equal to the value $(V_t - V_{pht})\rho max$, and when the band assignment determining unit decides to assign the call with the peak speed, the assignment evaluation unit decides to admit the call only when the value $(V_{pht} + V_p)$ is smaller than or equal to the value $(V_t - V_{avt})\rho max$.

It is further preferable that the band assignment determining unit comprise a comparison unit for comparing $(V_t - V_{pht})$ and X, where $V_t$ is the regulated speed of the transmission line, $V_{pht}$ is the sum of peak speeds of all calls already assigned with peak speeds, and X is the minimum number of calls possible to be assigned with average speeds, whereby when the value $(V_t - V_{pht})$ is larger than or equal to the value X, the call is assigned with the average speed, and when the value $(V_t - V_{pht})$ is smaller than the value X, the call is assigned with the peak speed.

According to a still further aspect of the present invention, there is provided a call admission control system in an asynchronous transfer mode exchange which receives a description of parameters of traffic upon reception of a call through a transmission line to another subscriber terminal, comprising: an estimating unit for estimating a band width of communication required by the calling subscriber based on the parameters described by the calling subscriber; a managing unit for managing the amount of band width used in the transmission line or the output route; and an admission determining unit, operatively connected to the estimating unit and to the managing unit, for determining whether or not the call should be admitted, under the condition that the call satisfies the communication quality, based on the band width estimated by the estimating unit and the used amount of band width managed by the managing unit.

It is preferable that the estimating unit comprise: a described parameter receiving unit for receiving an average speed $V_{av}$ and a peak speed $V_p$ of the bandwidth of the calling subscriber; a comparing unit for comparing the ratio of the peak speed $W_{BT}$ of the transmission line and the peak speed $V_p$ of the calling subscriber with a predetermined value X, where X is the minimum number of calls possible to be assigned with an average speed; an average and dispersion estimating unit, operatively connected to the comparing unit, for estimating, when the comparison result is that the ratio $W_{BT}/V_p$ is smaller than the predetermined value X, an average $E[Z]$ and a dispersion $V[Z]$ of the data speed from the calling subscriber by the following equations:

$$E[Z] = V_p \times P_1 + 0 \times (1 - P_1) = V_p \times P_1 = V_{av}$$
$$V[Z] = (V_p - V_{av})^2 \times P_1 + (0 - V_{av})^2 \times (1 - P_1)$$
$$= V_{av} \times (V_p - V_{av})$$

where $P_1$ is the probability of ON of the data from the subscriber terminal, and Z is the random variable of the data transmission speed.

It is also preferable that the estimating unit comprise: a described parameter receiving unit for receiving an average speed $V_{av}$ and a peak speed $V_p$ of the bandwidth of the calling subscriber; a comparing unit for comparing the ratio of the peak speed $W_{BT}$ of the transmission line and the peak speed $V_p$ of the calling subscriber with a predetermined value X, where X is the minimum number of calls possible to be assigned with an average speed; an average and dispersion estimating unit, operatively connected to the comparing unit, for estimating, when the comparison result is that the ratio $W_{BT}/Vp$ is smaller than the predetermined value X, an average $m_c$ and a dispersion $\sigma_c^2$ of the transmitting cells per unit time from the calling subscriber terminal by the following equations:

$$m_c = E[N] = E[Z/Cl] = E[Z]/Cl = Vav/Cl$$

$$\sigma_c^2 = V[N] = V[Z/Cl] = V[Z]/Cl^2 = Var(Vp - Vav)/Cl^2$$

where N is the random variable of the number of the transmitted cells, Cl is the cell length, and Z is the random variable of the data transmission speed.

It is further preferable that the managing unit manage the amount of data used in the band width by the average and the dispersion of the communication speed.

It is further preferable that the managing unit manage the amount of data used in the band width by the average and the dispersion of the number of cells per unit time.

It is further preferable that the admission determining unit employ the distribution of all communication speeds in the transmission line or the output route as a Gaussian Distribution, and the condition to satisfy the communication quality be the following condition:

$$m_B + PO\sigma_B \leq W_{BT}$$

where $m_B$ is the average of all communicating speeds under communication, PO is the minimum value of P which satisfies the condition:

$$OVF_B \leq 1 - F_1(P)$$

where $OVF_B$ is the probability of the impossibility to enter into the transmission line, and $F_1(P)$ is expressed as follows:

$$F_1(P) = \frac{1}{\sqrt{2\pi}} \int_{-\infty}^{P} \exp(-z^2/2) dz$$

It is further preferable that the admission determining unit employ the distribution of all numbers of cells per unit time in the transmission line or in the output route as a Gaussian distribution, and the condition to satisfy the communication quality be the following condition:

$$m_x + PO\sigma_x \leq S + M$$

where $m_x$ is the average of all cells generated during the communication, S is the maximum number of cells which can be carried by the transmission link, M is the buffer capacity, and PO is the value which satisfies the condition:

$$ovfl + Lc = 1 - \Phi(PO)$$

where Lc is the quality standard of the cell loss rate, and $\Phi(P)$ is expressed as:

$$\Phi(P) = \frac{1}{\sqrt{2\pi}} \int_{-\infty}^{P} \exp(-z^2/2) dz$$

According to a still further aspect of the present invention, there is provided a traffic control system for an asynchronous transfer mode exchange which receives a description of parameters of traffic upon reception of a call, comprising: an asynchronous transfer mode switch; a discard switch, in the asynchronous transfer mode switch, for discarding a part of cells of the call; a buffer storage, in the asynchronous transfer mode switch and operatively connected to the discard switch, for storing cells passed through the discard switch; a cell amount detecting unit, operatively connected to the buffer storage, for detecting the amount of cells stored in the buffer memory; a congestion determining unit, operatively connected to the cell amount detecting unit, for determining the amount of cells in the buffer storage based on a plurality of threshold values; and a discard switch control unit, operatively connected to the congestion determining unit and to the discard switch, for controlling the discard switch in response to the amount of cells determined by the congestion determining unit.

According to a still further aspect of the present invention, there is provided a traffic control system for an asynchronous transfer mode exchange which receives a description of parameters of traffic upon reception of a call, comprising: an asynchronous transfer mode communication path; a monitoring unit for providing a breaching cell, which is entering into the front stage of the asynchronous transfer mode communication path with parameters beyond the described values of the call, with a mark; and a congestion determining unit; the asynchronous transfer mode communication path comprising: a first discard switch for discarding the marked cell; a second discarding switch for discarding a low priority cell; and a buffer storage for temporarily storing cells passed through the first and second discard switches, having a plurality of regions determined by a plurality of threshold values; and the congestion determining unit having a unit for discriminating the region to which the used amount in the buffer storage belongs by units of the plurality of threshold values, the first and second discard switches being controlled in accordance with the result of the discrimination.

It is preferable that the plurality of threshold values be first, second, and third threshold values, and the congestion determining unit having a unit for driving the first discard switch for discarding the marked cells when the used amount in the buffer storage exceeds, the second threshold value, and for terminating the drive of the first discard switch when the used amount in the buffer storage falls below the first threshold value.

It is also preferable that the congestion determining unit have a unit for driving the first and the second discard switches when the used amount in the buffer storage exceeds the third threshold value and for terminating the drive of the second discard switch when the used amount in the buffer storage falls below the second threshold value.

It is further preferable that the system further comprise: a timer which is initiated in response to the drive of the second discard switch and is terminated in response to the termination of the drive of the second discard switch and an alarm generating unit, operatively connected to the timer, for generating an alarm when the timer value exceeds a predetermined value.

According to a still further aspect of the present invention, there is provided an asynchronous transfer mode switching system for receiving a cell from one of a plurality of input highways and for outputting the cell to a desired one of a plurality of output highways, the cell being provided with a plurality order in accordance with a discard characteristic of the cell, comprising: buffer units each for avoiding an interference of cells, the number of the buffer units being the same as the number of the input highways for each output highway; a cell accumulation measuring unit, operatively connected to each of the buffer units, for measuring the amount of cells accumulated in the buffer storage; and a cell discarding unit, operatively connected to the buffer storage and to the cell accumulation measuring unit, for discarding a cell with a relatively low priority order when the cell accumulation amount exceeds a predetermined cell accumulation amount.

It is preferable that the buffer units be connected with a read-out multiplexing control line through which a token, which provides a right for reading out a cell, is circulated, and when the arrival interval of the token exceeds a predetermined token arrival interval, the cell discarding unit discards a cell with a relatively low priority order.

It is also preferable that the cell discarding unit discard a cell having a relatively low priority order on the input highway before being written into the buffer storage.

It is further preferable that the cell discarding unit discard a cell having a relatively low priority order from the buffer storage.

It is further preferable that the cell discarding unit discard a cell having a relatively low priority order on the output highway after the cell is read out from the buffer storage.

BRIEF DESCRIPTION OF THE DRAWINGS

The above objects and features of the present invention will be more apparent from the following description of the preferred embodiments with reference to the accompanying drawings, wherein:

FIG. 3A and FIG. 3B, in the composite, comprises a flowchart explaining the operation of a call admission control according to an embodiment of the present invention;

FIG. 5 is a flowchart explaining the operation at the end of a call according to an embodiment of the present invention;

FIG. 6 is a diagram showing data of subscribers used in the call admission control according to an embodiment of the present invention;

FIG. 7 is a diagram showing a data base for the output route used in the call admission control according to an embodiment of the present invention;

FIGS. 9A and 9B, in the composite, comprises a diagram explaining a principle of a call admission control according to another embodiment of the present invention;

FIG. 19 is a diagram showing data of subscribers used in the call admission control shown in FIG. 17;

FIG. 20 is a diagram showing a data base for the output route used in the call admission control shown in FIG. 17;

FIG. 30 is a time chart explaining the operation of the read multiplexing control unit shown in FIG. 29;

FIGS. 31A and 31B, in the composite, comprise a block diagram of a priority control apparatus according to a still further embodiment of the present invention; and FIG. 32A and 32B in the composite a block diagram comprise of a priority control apparatus according to a still further embodiment of the present invention.

DESCRIPTION OF THE PREFERRED EMBODIMENTS

The embodiments of the present invention will be described hereinafter with reference to the drawings.

Figure 1:
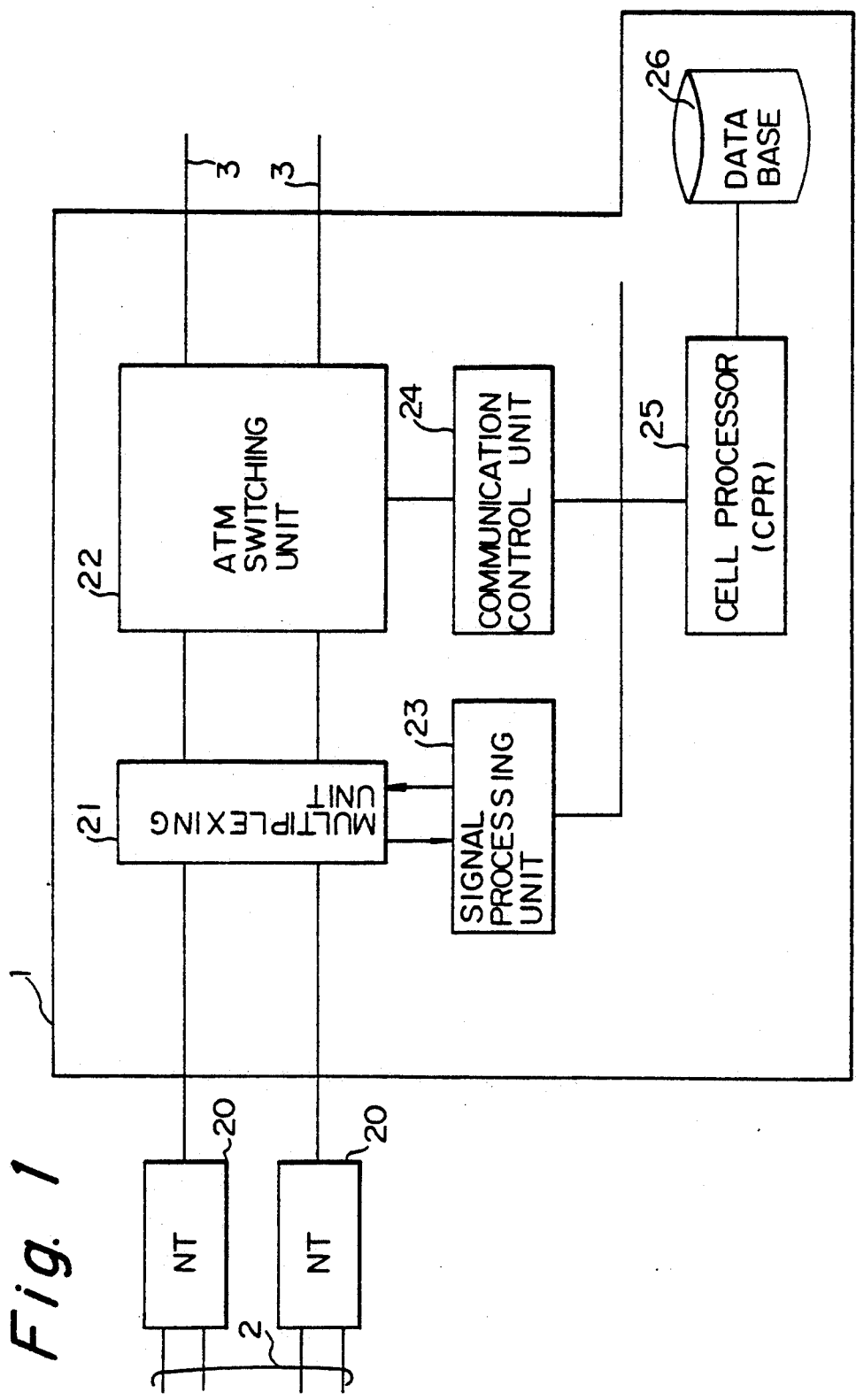
FIG. 1 is a block diagram of an ATM switching system according to an embodiment of the present invention.

FIG. 1 shows a general construction of an ATM switching system used in an embodiment of the present invention. In the figure, the shown embodiment is directed to the arrangement including an ATM switching system 1 which has a plurality of output highways 3. Subscriber terminals 2 are connected to the ATM switching system 1 via network terminals (NT) 20.

The ATM switching system 1 includes a multiplexing unit 21 for multiplexing information entered through the respective subscriber terminals 2, an ATM switching unit 22 for establishing a communication path, a signal processing unit 23 for performing exchanges of signals to and from the subscriber terminals 2 and another ATM switching system, a communication control unit 24 for performing communication control including traffic control functions, and a call processing unit 25 for controlling a call admission control. The multiplexing unit 21 is connected to the subscriber terminals 2 via the network terminals 20, to the ATM switch unit 22 and to the signal processing unit 23. The ATM switching unit 22 is, in turn, connected to the communication control unit 24 and to external circuits via output highways 3. The signal processing unit 23 is connected to the Communication control unit 24 and to the call processing unit 25. The communication control unit 24 is connected to the call processing unit 25. The call processing unit 25 is connected to a data base 26 which stores data necessary for performing call processing. The data base 26 may be realized by, for example, a magnetic disk unit.

Each subscriber terminal 2 is designed for producing a call connection request together with described parameters representative of attributes of the requesting call, i.e., the calling subscriber terminal 2. The requesting call carrying the attribute parameters from the subscriber terminal 2 is transferred to the ATM switching system 1 via the network terminator 20. The requesting call thus arrived to the ATM switching system 1 is input to the signal processing unit 23 via the multiplexing unit 21 and further input to the call processing unit 25 and to the communication control unit 24. The attribute parameters are transferred from the multiplexing unit 21 to the call processing unit 25 via the signal processing unit 23.

The communication control unit 24 is responsive to the call connection request signal to select one of the output highways 3 and to output information indicative of the selected output highway number to the call processing unit 25. The call processing unit 25 judges whether the requesting call is to be accepted or rejected. The judgment in the call processing unit 25 is performed on the basis of the attribute parameters of the requesting call, the output highway number selected by the communication control unit 24, and the average and the dispersion of the band width, i.e., the bit rates or the data speeds, of data on the selected output highway. The attribute parameters of the requesting call, the output highway number selected by the communication control unit 24, and the average and the dispersion of the band width are stored in the data base 26. The result of the judgment is transferred to the communication control unit 24. Also, in case that rejection of the requesting call is decided, such negative decision is also announced to the subscriber terminal 2 via the signal processing unit 23, the multiplexing unit, and the network terminator 20.

Figure 2:
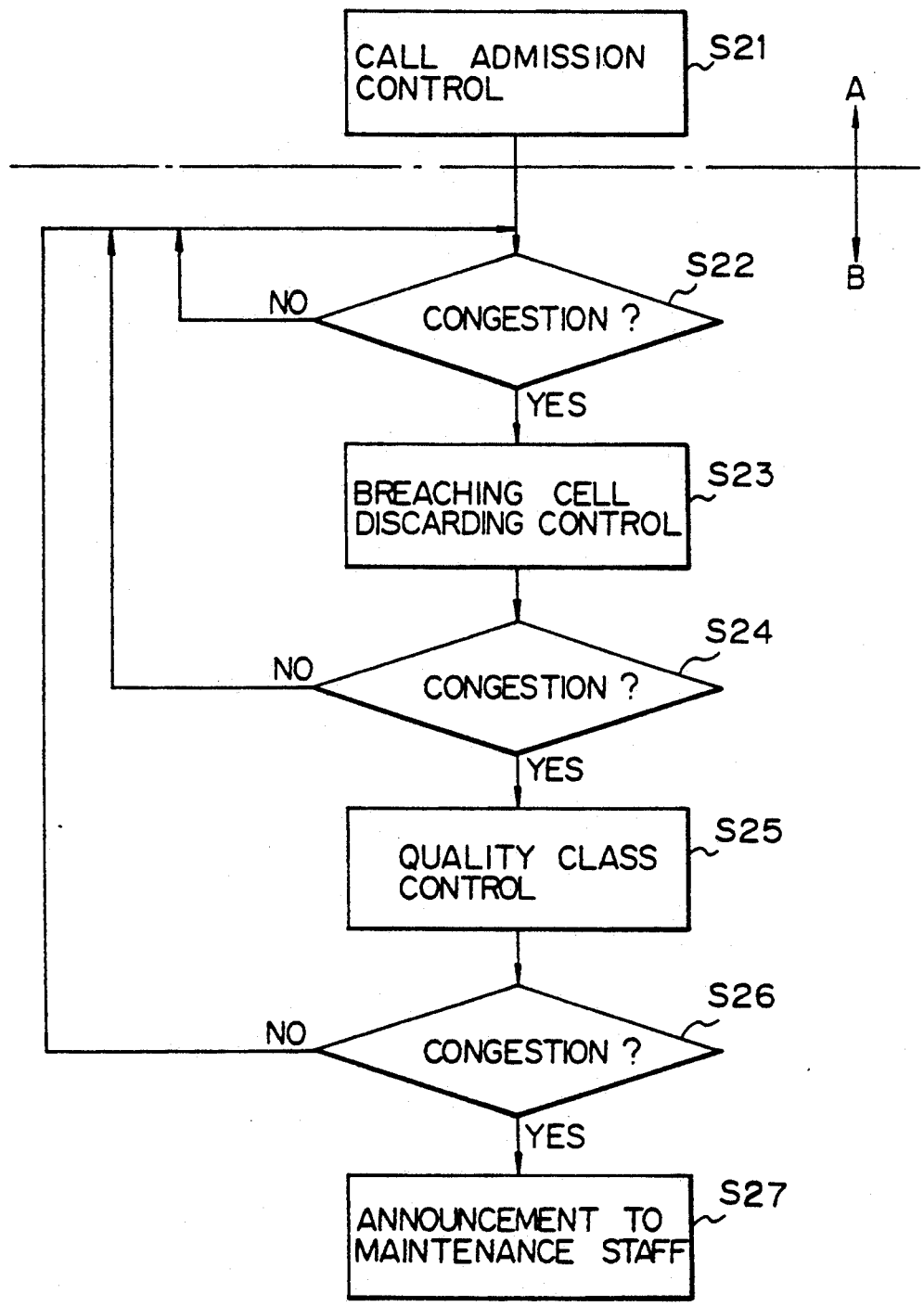
FIG. 2 is a general flow chart showing the overall traffic control according to the present invention.

FIG. 2 shows an overall process of the traffic control according to the present invention. In FIG. 2, first, a call which is requesting a call connection is detected. Then, at step S21, a call admission control is performed according to the present invention. Then, after the call is admitted, at step S22, judgment is made whether or not congestion is occurring. When congestion is occurring, cells which are breaching the described parameters are discarded at step S23.

Then, a judgment is made whether the congestion is resolved, at step S24. When congestion is maintained despite the discarding of the breaching cells, quality class control is formed at step S25.

When congestion is further maintained at step S26, a process for announcing that, for example, the transmission capacity is too small or extension facilities should be provided to a maintenance staff, is performed.

In the processed set forth above, there are the call admission control process as indicated by A and the congestion control process as indicated by B.

FIG. 3 shows a process of judgment of acceptance or rejection of the requesting call, executed by the call processing unit 25 in the ATM switching system shown in FIG. 1.

Figure 3B:
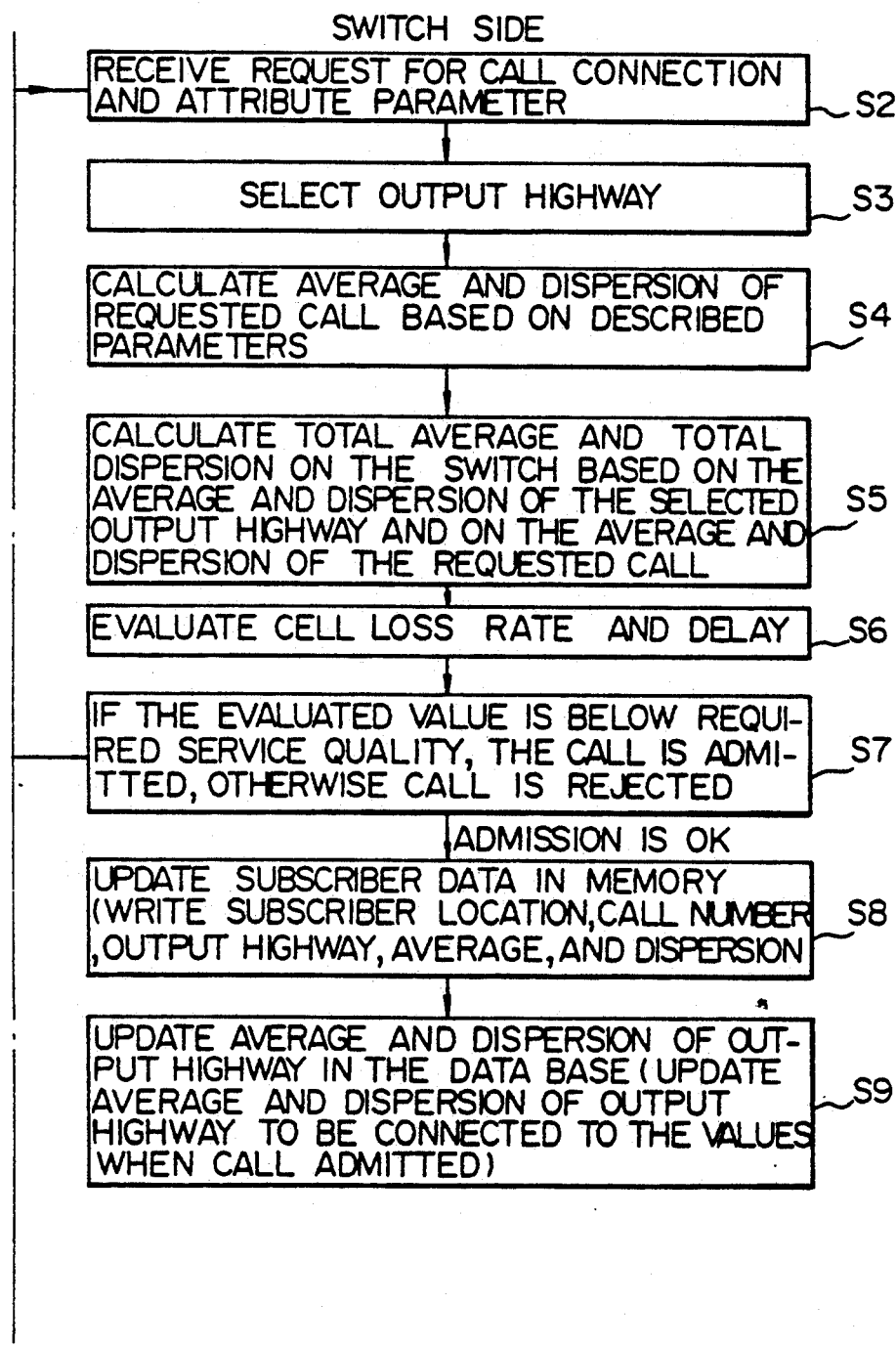

In FIGS. 3A and 3B, at first, at step S1, a request for call connection is entered with the attribute parameters via the subscriber terminal 2. The attribute parameters to be entered with the call connection request are, for example, as follows:

(a) peak speed Vp of data from the calling subscriber terminal;

(b) burst period $\alpha^{-1}$;

(c) idle period $\beta^{-1}$ between burst periods;

(d) average speed Vav of the data from the calling subscriber terminal;

(e) the number, Nc, of cells generated during the burst period;

(f) burst rate Rb; and (g) burst type;

All of the above-mentioned attribute parameters are not required but some of them should be available for deriving an average and a dispersion of the band width (or bit rates or speeds) of the requesting call. Also, by utilizing known attribute parameters, unknown attribute parameters can be arithmetically derived. For instance, the peak speed Vp can be derived from the average speed Vav, the burst period $\alpha^{-1}$ and the idle period $\beta^{-1}$; the number Nc of cells to be generated within the burst period can be derived based on the peak speed Vp and the burst period $\alpha^{-1}$; the burst ratio Rb can be derived from the average speed Vav and the peak speed Vp, or, alternatively, the burst period $\alpha^{-1}$ and the idle period $\beta^{-1}$.

The call connection request carrying the attribute parameters as entered at step S1 is transferred, at step S2, to the ATM switching system 1 and then input to the call processing unit 25 and the communication control unit 24 via the multiplexing unit 21 and the signal processing unit 23. Then, at step S3, the communication control unit 24 selects the output highways 3 for the requesting call.

The call processing unit 25 derives, at step S4, the average and the dispersion of the requesting call on the basis of the attribute parameters identified in the requesting call.

As described above, the average and the dispersion can be derived by utilizing some of the described attribute parameters, as follows.

(a) When the described parameters are the peak speed Vp, the burst period $\alpha^{-1}$ and the idle period $\beta^{-1}$, the average Aa and the dispersion VARa can be derived by the following equations:

$$Aa = \frac{1}{1+\eta} \times \frac{Vp}{Vt} \tag{1}$$

$$VARa = \lambda \times SCV \tag{2}$$

where $\eta = \beta^{-1}/\alpha^{-1}$, and $\lambda = Aa/h$, $h = Cl/Vt$, and Cl is the cell length.

As shown in the equation(1), the average Aa can be derived from the peak speed Vp, the burst period $\alpha^{-1}$ and the burst interval $\beta^{-1}$. Here, Vt is the peak speed of the communication path which is known with respect to the ATM switching system 1. On the other hand, the dispersion VARa can be derived through the equation (2).

(b) When the described attribute parameters are the average speed Vav, the number Nc of cells generated during a burst period $\alpha^{-1}$, and the burst ratio Rb, the average Aa and the dispersion VARa can be derived by the following equations:

$$Aa = \frac{Vav}{Vt} \tag{3}$$

$$VARa = \lambda \times SVC \tag{4}$$

where $\lambda = Aa/h$, $h = Cl/Vt$, Cl is the cell length, and $SCV = (2Nc-1) \times Rb^2$. Similar to the above case (a), the peak speed Vt of the communication path and the cell length Cl are utilized as known values.

(c) When the described attribute parameters are the peak speed Vp, the burst period $\alpha^{-1}$, and the burst rate Rb, the average Aa and the dispersion VARa can be derived by the following equations:

$$Aa = (1 - Rb)\frac{Vav}{Vt} \tag{5}$$

$$VARa = \lambda \times SVC \tag{6}$$

where $\lambda = Aa/h$, $h = Cl/Vt$, Cl is the cell length, $SCV = (2Nc-1) \times Rb^2$, and $Nc = \alpha^{-1} \times Vp/Cl$.

(d) When the described attribute parameters are the peak speed Vp, the average speed Vav, and the burst period $\alpha^{-1}$, the average Aa and the dispersion VARa can be derived by the following equations:

$$Aa = \frac{Vav}{Vt} \tag{7}$$

$$VARa = \lambda \times SVC \tag{8}$$

where $\lambda = Aa/h$, $h = Cl/Vt$, Cl is the cell length, $SCV = (2Nc-1) \times Rb^2$, and $Nc = \alpha^{-1} \times Vp/Cl$.

(e) When the described attribute parameters are the peak speed Vp, the average speed Vav, and the number Nc of cells generated during a burst period $\alpha^{-1}$, the average Aa and the dispersion VARa can be derived by the following equations:

$$Aa = \frac{Vav}{Vt} \tag{9}$$

-continued $$VARa = \lambda \times SVC \tag{10}$$

where $\lambda = Aa/h$, $h = Cl/Vt$, Cl is the cell length, $SCV = (2Nc-1) \times Rb^2$, and $Rb = 1 - Vav/Vp$.

At step S4, depending upon the attribute parameters described by the subscriber terminal 2, the equations are selected from the above equations (1) to (10) for deriving the average Aa and dispersion VARa.

Then, at step S5, the call processing unit 25 receives the selected output highway number from the communication control unit 24 and derives a total average and a total dispersion with respect to the selected output highway 3. At this time, the call processing unit 25 reads out the average Ad and dispersion VARd of the already assigned calls from the data base 26 for utilizing the calculation of the total average and the total dispersion by the following equations:

Total average: $At = Ad + Aa$ (11)

Total dispersion: $VARt = VARd + VARa$ (12)

As can be seen from the foregoing equation (11), the total average At is derived as a sum of the stored total average Ad and the predicted average Aa of the requesting call. Also, the total dispersion VARt is derived as a sum of the stored dispersion VARd and the predicted dispersion VARa of the requesting call, as seen from equation (12). By performing arithmetic operation utilizing the foregoing equations, the predicted total average and the predicted total dispersion VARt, when the requesting call is connected to the selected output highway, can be derived.

Then, at step S6, a cell loss rate and an end-to-end delay characteristic of the ATM switching system, when the requesting call is admitted, are derived. The cell loss rate and the end-to-end delay characteristic can be derived by the following equations:

$$\text{Cell Loss Rate } OVF = \frac{1 - PO}{At} \tag{13}$$

where $$PO = \frac{1 - At}{1 - At^2 \text{EXP}(\gamma m)}$$

$$\gamma = \frac{2[(At/h) - (1/h)]}{VARt + (1/h) - (1 - At)}$$

m: amount of data in the buffer $$\text{delay } D = \frac{1}{Navt} \times \frac{At}{1 - At} \times PO \times \tag{14}$$

$$\left[ \text{EXP}(\gamma m)\left\{ (1 - At)(m + 1) + \frac{1}{\gamma} - m - \frac{1}{2} \right\} - \frac{1}{\gamma} + \frac{1}{2} \right]$$

wherein Navt is an average number of cells generated in a unit time; and $At = Navt \times h$.

Once the cell average rate OVF and the end-to-end delay D are derived through the equations (13) and (14), a judgment is made at step S7 whether or not the required service quality can be maintained on the basis of the derived cell loss rate OVF and the end-to-end delay D. To this end, the call processing unit 25 is provided with threshold values of the cell loss rate and the end-to-end delay D. The call processing unit 25 thus compares the derived cell loss rate OVF and the end-to-end delay D with respectively corresponding threshold values. When both of the cell loss rate OVF and the end-to-end delay D are smaller than the associated threshold values, then a judgment can be made that the required quality of service can be maintained and thus the judgment can be made that the requesting call is acceptable. On the other hand, when either of the cell loss rate OVF and the end-to-end delay D is greater than the associated threshold values, then the judgment is made that the required service quality cannot be maintained. In such a case, a decision is made to reject the requesting call.

Figure 4:
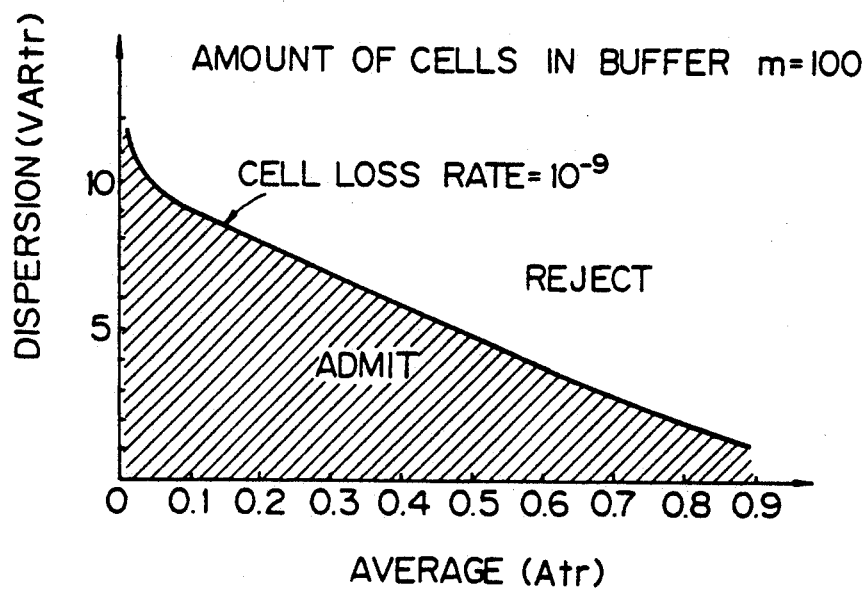
FIG. 4 is a characteristic diagram showing a relation between an average and a dispersion of the band width of a call for admitting the call, used in an embodiment of the present invention.

FIG. 4 is a graph showing the relationship between the average and the dispersion for explaining an alternative method of evaluating the cell loss rate and the end-to-end delay. In FIG. 4, instead of performing direct calculation through equations (13) and (14), the total average Atr and the total dispersion VARtr which satisfies the required service quality of cell loss rate and end-to-end delay are previously determined through an off-line process of the switching system, utilizing the equations 913) and (14). In such case, the total average AT and the total dispersion VARt are compared with the acceptable maximum total average Atr and the total dispersion VARtr. When At≦Atr, and VARt≦VARtr, the requesting call is decided to be accepted and otherwise rejected. For example, assuming the required cell loss rate is $10^{-9}$, then the Atr and the VARt can be derived as illustrated in FIG. 4. Namely, In FIG. 4, the hatched area is the range for accepting ("ADMIT") the requesting call. Therefore, upon arrival of the requesting call, the total average At and the total dispersion VARt are derived based on the described attribute parameters, and when they are within the hatched rate ("ADMIT"), the call will be accepted.

When the requesting call cannot be accepted, notice is given to the corresponding subscriber terminal 2 for rejection of the requesting call. On the other hand, when the call is acceptable, the process of step S8 (FIG. 3B) is performed.

Namely, at step S8, various information with respect to the subscriber terminal 2 associated with the accepted call is temporarily stored in a memory in the call processing unit 25. The information relating to the subscriber terminal may be the location of the subscriber terminal, the call number, the output highway number, and the average and the dispersion of the call.

Then, at step S9, with respect to the output highway 3 associated with the accepted call, data in the data base 26 is updated. Namely, the information of the respective output highways 3 stored in the data base 26, the information relating to the output highway 3 used for the accepted call is updated. In the data base 26, the total average At and the total dispersion VARt of each output highway are stored. By this updating process at step S9, the total average At and the total dispersion VARt of the output highway, when the requesting call is connected to the output highway, are stored in the memory.

Through the process set forth above, the call acceptance and rejection control process, with respect to the call connection request entered from the subscriber terminal 2 into the ATM switching system 1, is completed. When a decision is made to accept the requesting call at step S7, a connection is established for providing communication after the processes of the steps S8 and S9.

Next, a process performed upon the end of the communication by the subscriber terminal 2 will be discussed with reference to the flowchart of FIG. 5.

At first, at step S10, a request for ending the call is entered from the subscribed terminal 2 to the ATM switching system 1. The ending request, upon arriving at the ATM switching system, is transferred to the communication control unit 24 and the call processing unit 25 via the multiplexing unit 21 and the signal processing unit 23. In response to this ending request, at step S12, the call processing unit 25 searches, in the buffer memory therein, for reading out information such as the output highway number, the average Ax and the dispersion VARx concerning the subscriber terminal through which the ending request is entered.

Then, at step s13, the call processing unit 25 updates the information such as the average Ad and the dispersion VARd relating to the relevant output highway 3 in the data base 26. By this process, the average and the dispersion of the call associated with the ending request are removed from the total average and the total dispersion stored with respect to the relevant output highway in the data base 26. The updated average Ad and the dispersion VARd can be expressed by:

Average:     Ad←Ad−Ax

Dispersion:  VARd←VARD−VARx

After completing of the update of the data base 26, at step S14, all information relating to the call from which the ending request is generated are delated by the call processing unit 25.

FIG. 6 shows the data structure in the buffer memory in the cell processing unit 25 for storing information relating to the subscriber terminals.

From the front address of the memory, the location number of a subscriber, a call number, an output highway ("Route") number, an average value, and a dispersion value are stored in order for a single subscriber. As can be appreciated, the buffer memory should have such a memory block for storing information of a plurality of subscribers.

FIG. 7 shows the structure of the information of the output highway data base in the data base 26.

As can be seen, the data base stores an output highway ("Route") number, an average value, and a dispersion valve, in that order for one output highway. A plurality of such memory blocks are included for covering all output highways.

According to the embodiment described with reference to FIGS. 1 to 7, by receiving the description of the attribute parameters from the subscriber terminal with a request for call connection, service qualities such as a cell loss rate and end-to-end delay characteristics can be evaluated in advance so that a requesting call can be rejected when the judgement is made that the required level of service quality cannot be maintained and the system can accept only a call for which a required quality of service can be maintained.

In the above described embodiment, the call admission control is carried out by evaluating the cell loss rate and the end-to-end delay. This evaluation process, however, is relatively complex and requires a number of steps o the process. To simplify the process of the evaluation another embodiment of the present invention is provided as described in the following. Further, congestion control after the call admission is also provided according to still another embodiment of the present invention.

Figure 8:
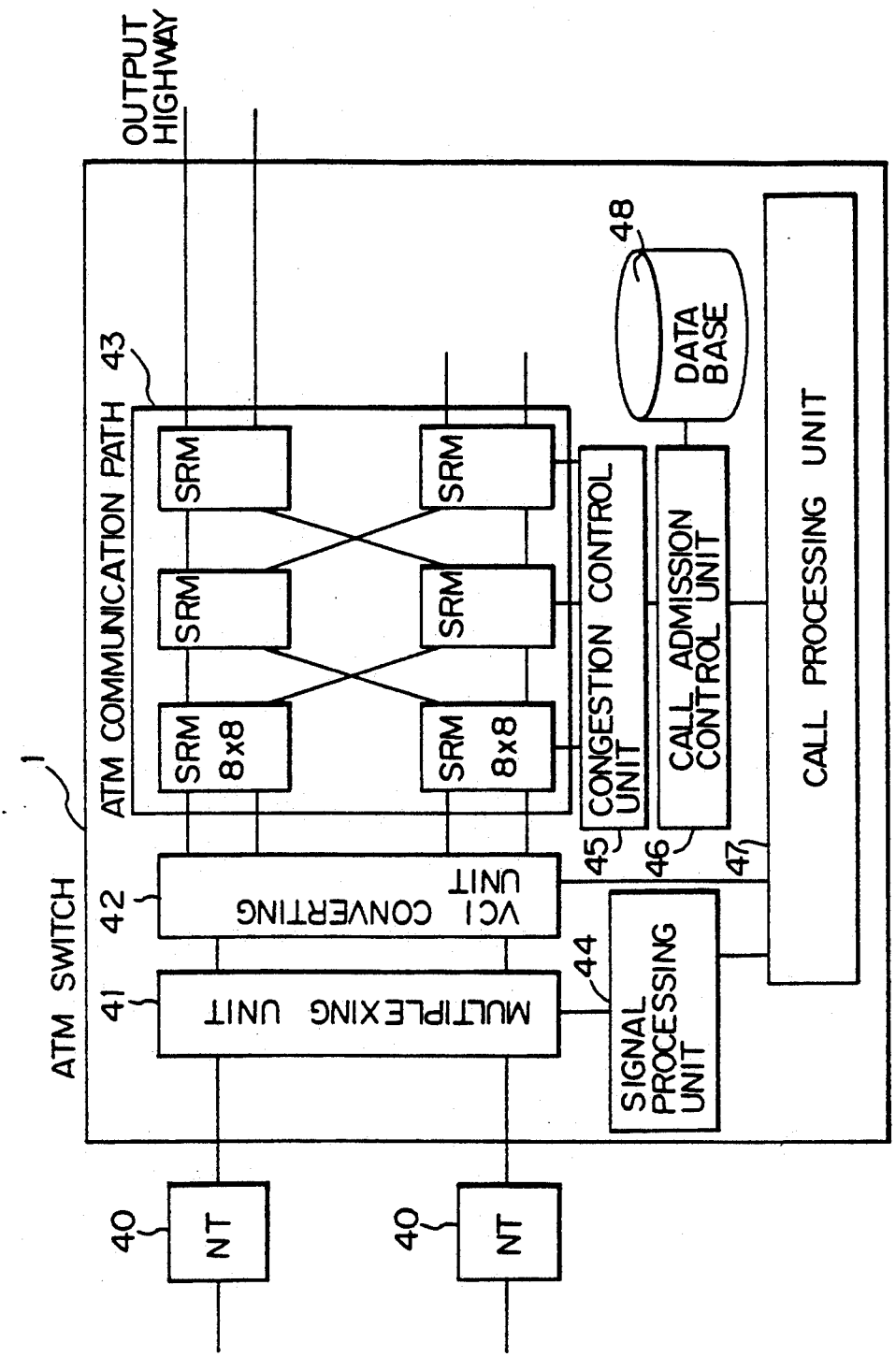
FIG. 8 is a block diagram showing the detailed hardware construction of the ATM switching system according to an embodiment of the present invention.

FIG. 8 shows a hardware construction of an ATM switching system according to another embodiment of the present invention. The hardware construction shown in FIG. 8 is a detailed construction of the construction shown in FIG. 1.

In the hardware construction of the ATM switching system shown in FIG. 8, a network terminator (NT) 40, to which the subscriber terminal is connected through a subscriber line, is connected to a multiplexing unit 41 and, then, is connected, through a virtual channel identifier (VCI) converting unit 42, to an ATM communication path 43. Call connection request information including the described parameters, the destination address, and so forth of the call from the subscriber is input to a signal processing unit 44 via the multiplexing unit 41 and then input to a call processing unit 47.

The call processing unit 47 operates a call admission control unit 46 to control the acceptance or the rejection of the requesting call. To this end, various data stored in a dated base (or RAM) 48 are used.

After a call is accepted by the call admission control unit 46, the call processing unit 47 controls the VCI converting unit 42 to establish a path for passing a cell therethrough. By this, the cell passes through switches (in this embodiment, SRM (Self Routing Module) switches are used) in the ATM communication path 43 and are output to the output highway.

The congestion control unit 45 detects the amount of data used in a buffer storage (not shown in FIG. 8) provided in each of the switches for performing a cell discard control.

FIG. 9A and FIG. 9B show a principle of a call admission control system in the ATM switching system shown in FIG. 8, according to another embodiment of the present invention.

In FIG. 9, the call admission control unit 46 includes a described parameter receiving unit 461 for receiving described parameters transmitted from subscribers, an arithmetic unit 462 or deriving (i.e., calculating) an average a and a dispersion v of the bit rates of a call, a band assignment judging unit 463, an average speed assigned evaluation unit 464, a peak speed assigned evaluation unit 465, and a data updating unit 467. A memory 466 is connected to the average speed assigned evaluation unit 464, to the peak speed assigned evaluation unit 465, and to the data updating unit 467. The memory 466 stores the speed Vt of the transmission line indicative of the transmission ability (i.e., capability) of the transmission line, the sum Vavt of all average speeds of assigned calls with average speeds, and the sum Vpht of all peak speeds of calls assigned with peak speeds.

According to the embodiment of the present invention shown in FIG. 9A and 9B, a judgement is made which one of the average speed and the peak speed should be assigned to the call which is requesting a call connection, and then an evaluation is made whether the transmission with the determined assignment is possible, thereby for making a decision of accepting or rejecting the call. Further, during the communication after the call is accepted, when congestion is caused, a control of cell admission is effected so as to maintain the service quality in the range of the described parameters.

In the operation of the call admission control system shown in FIGS. 9A and 9B, when a subscriber generates a call, the subscriber describes attributes (i.e., some of the information such as a peak speed Vp of data, an average speed Vav of data, and a burst period $\alpha^{-1}$ representing a burst characteristic, and a burst resting interval period $\beta^{-1}$) of the call together with the destination address information. The described parameters are received by the described parameter receiving unit 461 and then transferred to the calculating unit 462 for calculation of an average and a dispersion of the cell traffic.

In the cell traffic average and dispersion calculating unit 462, the average (a) of the cell traffic and the dispersion (v) of the cell traffic are calculated with respect to the call which is requesting a call connection, based on the described parameters. The result of the calculation is supplied to the band assignment determining unit 463 which performs a predetermined arithmetic operation for making a judgment whether the average speed or the peak speed should be assigned to the call. The assignment of the average speed is a probability assignment. This assignment of the peak speed is a definite assignment.

In this judgement, when the call is one with a large variation rate of speeds or when the peak speed is extremely high, the peak speed is assigned to the call; and otherwise, the average speed is assigned to the call.

Once a band or, in other words, a speed is assigned by the band assignment determining unit 463, the average speed assigned evaluation unit 464 or the peak speed assigned evaluation unit 465, corresponding to the determined assignment, is actuated.

The evaluation unit 464 determines whether or not the call which is requesting a call connection can be assigned to be transmitted to the output highway in which the sum of all average speeds of calls assigned with average speeds is already assigned. The evaluation unit 456 determines whether or not the call which is requesting a call connection can be assigned to be transmitted to the output highway in which the sum of all peak speeds of calls assigned with peak speeds is already assigned. If transmission is possible, a signal indicating "accept" is generated to respond to the subscriber who has set up the call.

At the same time, the data updating unit 467 is actuated for updating the total average speeds Vavt or the total peak speeds Vpht in the memory 16, depending upon the acceptance of the assigned call with the average speed or with the peak speed. If it is judged by the evaluation unit 464 or 465 that the call cannot be assigned, a signal indicating "rejection" is generated to respond to the subscriber.

The practical implementation of the embodiment of the present invention shown in FIGS. 9A and 9B will be further described below.

Figure 10:
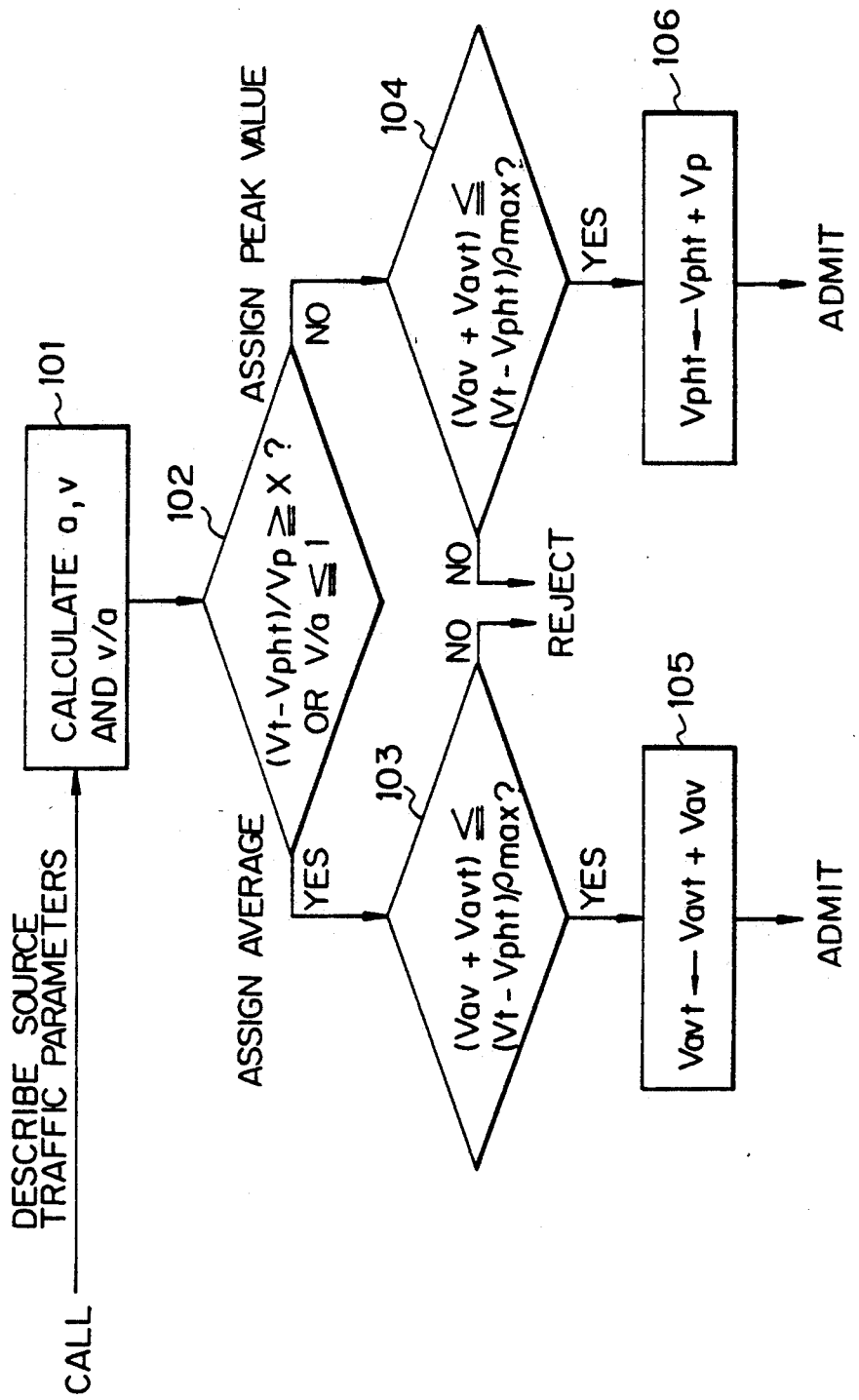
FIG. 10 is a flowchart explaining in detail the operation of the call admission control showing in FIG. 9.
Figure 12:
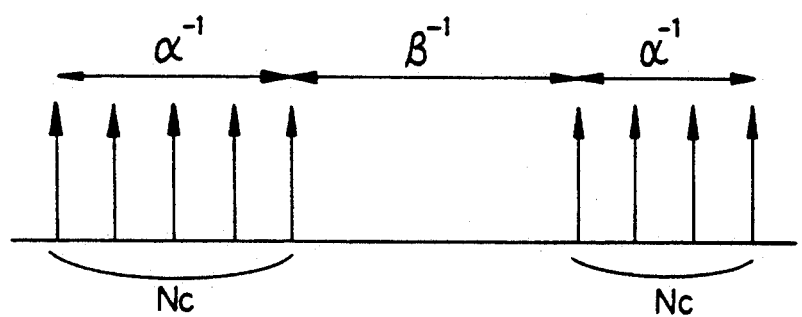
FIG. 12 is a diagram showing a model of a burst traffic of cells for explaining the call admission control shown in FIG. 10.

FIG. 10 shows a flowchart to be executed by the call admission control unit 46 in the ATM switching system shown in FIG. 8. In FIG. 10, when a call connection request is set up, source traffic parameters and a destination address information are described at the calling terminal. As the parameters for representing the characteristics of the communication to be used, some of the following information are used:

Peak speed (Vp) of data;
Average speed (Vav) of data;
Burst period $\alpha^{-1}$
Idle Period $\beta^{-1}$
Number of generated cells (Nc) within a burst period;

The burst period $\alpha^{-1}$, the idle period $\beta^{-1}$, and the number of generated cells (Nc) are shown in FIG. 12.

Assuming that the described parameters are the peak speed Vp of data, the average speed Vav of data, and the generated cell number Nc within a burst period, then the average a and the dispersion v of the cell traffic are calculated at step 101 by the following equations (101) and (102). Subsequently, utilizing the calculated average and dispersion, a variation rate V/a is calculated at step 101. Here, Vt is the speed of the transmission line (transfer capacity) stored in the data base 48 (FIG. 8).

$$a = Vav/Vt \tag{101}$$

$$v = a \times (2Nc-1) \times (1 - Vav/Vp) \tag{102}$$

Then, a judgement according to the following equations (10) and (104) is performed at step 102:

$$(Vt - Vpht)/Vp \geq X \tag{103}$$

$$v/a \leq 1 \tag{104}$$

where, Vpht is the sum of all peak speeds of the calls already assigned with the peak speeds, which is stored in the data base 48 in FIG. 8, and X is a predetermined constant value (e.g. 90) which is the minimum number of cells available to be assigned with the average speed. In the equation (103), the left side represents the number of calls each having the peak speed Vp capable to be assigned in the remaining band (Vt−Vpht) which is the subtraction of the sum Vpht of the peak speeds of all calls already assigned with peak speeds from the transmission line speed Vt. The number of cells capable of being assigned in the remaining band is compared with the predetermined value X. The equation (104) is established for making the judgement whether the variation rate is smaller than or equal to 1. When the variation rate v/a is small, the dispersion is relatively small so that the burst characteristic is small. At this step 102, if (Vt−Vpht)/Vp≧X or if v/a≦1, a call with the average speed is assigned, and if both of the conditions are not satisfied, a call with the peak speed is assigned.

When it is determined that a call with the average speed should be assigned, judgement is made, at step 103, whether the following equation (105) can be satisfied or not:

$$(Vav - Vavt) \leq (Vt - Vpht)\rho_{max} \tag{105}$$

where, $\rho_{max}$ is the maximum utilization ratio of the transmission line, e.g., 0.7 to 0.9, which is determined by a predetermined cell loss rate and data amount in the buffer memory, by utilizing the conventionally used M/D/1(m) model in traffic calculations.

This judgement is to discriminate, when the average speed Vav of the requesting call is added to the sum Vavt of the all average speeds of calls already assigned with the average speeds, whether the derived sum is smaller than 70% (in case $\rho_{max}$ is 0.7) of the value derived by subtracting the sum Vpht of the peak speeds of calls already assigned with the peak speeds from the speed Vt of the transmission line. When the relationship of the foregoing equation (105) cannot be established, noticed is given that reception of the call which is requesting a call connection is rejected.

On the other hand, if the equation (105) is satisfied, data is updated, at step 105, for providing a service to the call which is requesting a call connection. Namely, to the sum Vavt of average speeds of all calls with the average speeds already assigned to the output highway for the communication being effected, the average speed Vav of the data of the requesting call is added to form a new total average speed Vavt which is stored in the data base 48. Also, a notice is given to the calling subscriber for acceptance of the call.

In the foregoing step 102, when a call assignment with the peak speed is determined, a judgement is made at a step 104 whether the sum, of the sum Vpht of the peak speed of all calls in communication and the peak speed Vp, is smaller than or equal to the value (Vt−Vavt)$\rho_{max}$. When (Vpht+Vp)>(Vt−Vavt)$\rho_{max}$, the requesting call is rejected.

When (Vpht+Vp)≦(Vt−Vavt)$\rho_{max}$, at step 106, The sum of the total peak speeds Vpht is updated by the sum of the Vpht+Vp and a notice is given to the calling subscriber for advising an acceptance.

In the foregoing discussion, the described parameters, upon occurrence of a call connection request, are a peak speed Vp, the number of generated cells Nc within the burst period, and the average speed Vav of the data. The calculation of the average and the dispersion by the use of these described parameters Vp, Nc, and Vav is the same as the case (e) already described with reference to the embodiment shown in FIG. 3. Similarly, the cases (a) to (d) with reference to the embodiment shown in FIG. 3 may also be applied to the calculation in the step 101 of th embodiment shown in FIG. 10.

Next, an actual example of the embodiment shown in FIG. 10 is further described with reference to FIGS. 11 and 12.

Figure 11:
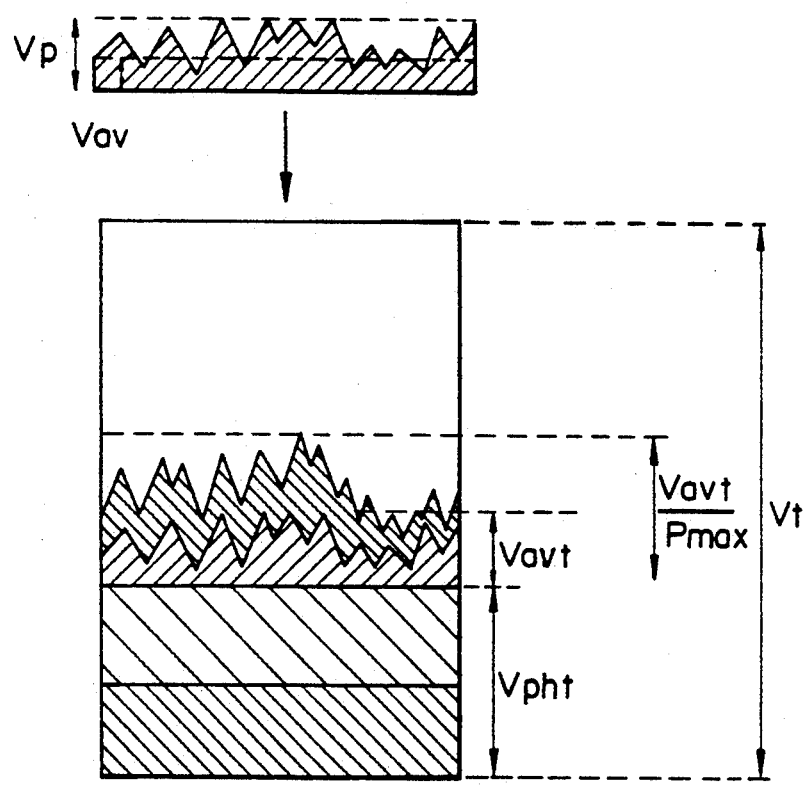
FIG. 11 is a diagram explaining assignment of band widths for the call admission control shown in FIG. 10.

FIG. 11 shows a concept of band assignment in the actual example, and FIG. 12 shows a burst traffic model of cells for understanding the burst period $\alpha^{-1}$, the idle period $\beta^{-1}$, and the number Nc of cells in a burst period.

In FIG. 11, it is assumed that the capacity Vt, i.e., the speed Vt, of the transmission line or the output highway is 140 Mbps (mega bits per second), the sum Vavt of the average speeds of all calls already assigned with the average speeds is 10 Mbps, and the sum Vpht of the peak speeds of all calls already assigned with the peak speeds is 20 Mbps. It is further assumed that the described parameters of the input call (referred to as A) are as follows:

$V_p$=32 Kbps, Nc=22 cells, and Vav=11.2 Kbps.

Then, calculations according to the above equations (101) and (102) can be made as follows:

$$\begin{aligned} a &= Vav/Vt = 11.2K/140M = 8 \times 10^{-5} \\ v &= a \times (2NC - 1) \times (1 - Vav/Vp) \\ &= 8 \times 10^{-5} \times (2 \times 22 - 1) \times (1 - 11.2K/32K) \\ &= 2.236 \times 10^{-3} \end{aligned}$$

$$V/a = 2{,}236 \times 10^{-3}/8 \times 10^{-5} = 27.95 \tag{106}$$

$$(Vt - Vpht)/Vp = (140M - 20M)/32K = 3750 \tag{107}$$

From the results of (106) and (107), when a judgement is made at the step 102 in FIG. 10, the result of (106) becomes greater than 1. However, assuming X=100, the result of (107) is greater than X. This enables an assignment of the average speed to the call A. Then, the process proceeds to the step 103 in FIG. 10 to perform the following calculation.

$$Vav = Vavt = 11.2K + 10M = 10.0112 \; Mbps \tag{108}$$

$$(Vt - Vpht)ax = (140M - 20M) \times 0.7 = 84 \; Mbps \tag{109}$$

From these results, since the valve Vav in the equation (108) is smaller that the value (Vt−Vpht) in the equation (109), the call A is decided to be acceptable. Subsequently, the data Vavt is updated at the step 105 as follows:

$$Vavt = Vavt + Vav = 10M + 11.2K = 10.0112 \ Mbps$$

Assuming that another input call B describes parameters Vp=130M, Nc=2000 cells, and Vav=100 Mbps, then the average a and the dispersion v are calculated as:

a=0.71, v=659.2
Then, v/a=928.4,
(Vt−Vpht)/Vp=(140M−20M)/130M=0.923. Therefore, in the judgement at the step 102, v/a>1 and (Vt−Vpht)/Vp<100 (where x=100). Therefore, the call B is assigned with the peak speed. Then, the process proceeds to the step 104 to perform the calculation of:

$$\begin{aligned} Vpht + Vp &= 20M + 130M \\ &= 150 \ Mbps > (140M - 20M) \times 0.7 \\ &= 84 Mbps. \end{aligned}$$

Therefore, the total peak speed exceeds the capacity of the transmission line. Thus, the call B is rejected.

In the above described embodiment, when (Vt−Vpht)/Vp is lower than the predetermined value X of, for example, 100, the call is assigned with the peak speed. The peak assignment itself, however, is not always a good basis for assuring efficient use of the transmission line or the output highway, because there are various peak values in various burst periods.

In the following embodiment, another call admission control system is described in which, when the value (Vt−Vpht)/Vp is lower than the predetermined value X of, for example, 100, the band to be used is estimated by another method in a call admission control system.

Figure 13:
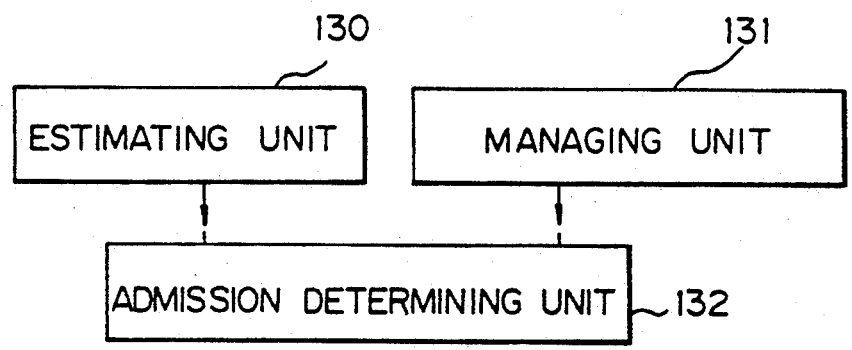
FIG. 13 is a block diagram showing a principle of a call admission control according to still another embodiment of the present invention.

FIG. 13 is a block diagram showing a principle of the embodiment of the call admission control system. In the figure, an estimating unit 130 and a managing unit 131 are connected to an admission determining unit 132.

The estimation of the band to be used is carried out in the estimating unit 130 by determining the average and the dispersion (or the standard deviation) of the communication speed of the calling subscriber and of the number of a transmitting cells per unit time, by using the described values of traffic of the average speed and the peak speed. Corresponding to this, the band used in the transmission line or the output highway is managed by the managing unit 131 by the total communicating speeds or the average and the dispersion (or the standard deviation) of the number of the transmitting cells, per total unit time, in communication. In the judgement of the call admission in the admission determining unit 132, the distribution of the total communication speeds on the transmission line or on the output highway is assumed as a Gaussian distribution. Then, the call admission is judged under a condition determined by determining the probability of the peak speed of transferred data on the transmission line or on the output highway, or under a condition determined by determining the loss rate of cells which overflow from a buffer storage provided at the transmission line of the output highway.

Figure 14:
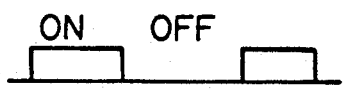
FIG. 14 shows a subscriber data communication model for explaining the call admission control shown in FIG. 13.

FIG. 14 shows a model of the communicating data from a subscriber. As shown in the figure, the communicating data is comprised of ON periods and OFF periods. Assume that the probability of being ON is $P_1$, accordingly, the probability of being OFF is $(1-P_1)$. Further assume that the subscriber describes an average Vav and a peak Vp of the transferred data byt the use of the model shown in FIG. 14.

According to the first estimating method, the average and the dispersion of the transferred data from the subscriber are determined by the following equations:

$$\left. \begin{aligned} \text{Average } E[Z] &= VpP_1 + 0(1-P_1) = VpP_1 = Vav \\ \text{Dispersion } V[Z] &= (Vp - Vav)^2 P_1 + (0 - Vav)^2(1 - P_1) \\ &= Vav(Vp - Vav) \end{aligned} \right\} \quad (201)$$

where Z is the probability variable of the data transfer speeds.

According to the second estimating method, the average (mc) and the dispersion ($\sigma c^2$) of the number of the transmitting cells from the subscriber per unit time are determined by the following equations:

$$\left. \begin{aligned} mc &= E[N] = E[Z/Cl] = E[Z]/Cl = Vav/Cl \\ \sigma C^2 &= V[N] = V[Z/Cl] = V[Z]/Cl^2 = Vav(Vp - Vav)/Cl^2 \end{aligned} \right\} \quad (202)$$

where N is the probability variable of the number of the transmitting cells, C1 is the cell length, and N=Z/Cl, and the relation between the speed of transmitting data and the probability variable Z is used.

The band management in the managing unit 132 is carried out as follows.

Management by the average and the dispersion of the total communication speeds under communication is first described. Assume that the average and the dispersion of the total communication speeds under communication are $m_E$ and $\sigma_E^2$. Also, assume that the average and the dispersion of the communication speeds of each call are $m_i$ and $\sigma_i^2$. Then the $m_i$ and $\sigma_i^2$ are determined by the first estimating method as follows:

$$\left. \begin{aligned} m_i &= Vavi \\ \sigma_i^2 &= Vavi(Vpi - Vavi) \end{aligned} \right\} \quad (203)$$

When n calls are under communication, the average and the dispersion of the total communication speeds under communication are determined as follows:

$$\left. \begin{aligned} m_B &= m_1 + \ldots m_n \\ \sigma_B^2 &= \sigma_1^2 + \ldots \sigma_n^2 \end{aligned} \right\} \quad (204)$$

Accordingly, based on the equations (204), the band of the transmission line or the output highway is managed.

Management by the average and the dispersion of the number of total cells under communication is now described. Assume that the average and the dispersion of the total number of cells generated during a communication are $m_x$ and $\sigma_x^2$ and n calls are under communication. Then, the following equations are obtained:

$$\left.\begin{aligned}m_x &= m_{c1} + \ldots + m_{cn} \\ \sigma_x^2 &= \sigma_{c1}^2 + \ldots \sigma_{cn}^2 \end{aligned}\right\} \quad (205)$$

where $m_{ci}=Vavi/Cl$ and $\sigma_{ci}^2=Vavi(Vp_1-Vavi)/Cl^2$, which are the average and the dispersion of the number of generated cells for each call. The transmission line or the output highway is managed in accordance with the equations (205).

The judgement of a call admission by the admission determining unit 132 is carried out as follows.

The judgement by using a probability which exceeds the peak speed of transferred data on the transmission line or on the output highway is first described. Assume that the distribution of the total data speeds under communication is a Gaussian distribution in accordance with the average and the dispersion of the equations (204). Namely, the probability F(X) of the total speeds of data under communication which is below X bps is expressed as:

$$F(X) = \frac{1}{\sqrt{(2\pi)}\sigma_B} \int_{-\infty}^{x} \exp[-(y - m_B)^2/2\sigma_B^2]dy \quad (206)$$

In the equation (206), assuming that $z=(y-m_E)/\sigma_B$, the following equation is obtained:

$$F(x) = \frac{1}{\sqrt{2\pi}} \int_{-\infty}^{\frac{x-m_B}{\sigma_B}} \exp\left(\frac{-Z^2}{2}\right)dz \quad (207)$$

Thus, a normal distribution having the average equal to 0 and the dispersion equal to 1 is obtained.

The probability $OVF_B$, which is the probability of a call which cannot be entered into the transmission line, is expressed as:

$$OVF_B = \frac{1}{\sqrt{2\pi}} \int_{-\infty}^{\frac{x-m_B}{\sigma_B}} \exp\left(\frac{-Z^2}{2}\right)dz \quad (208)$$

where $W_{BT}$ is the peak speed of data on the transmission line and $W_{BT}$ is the same as Vt shown in FIG. 11, and x is the total speed of data. This expression means that the probability of the total speed of data which exceeds the peak speed of data $W_{ET}$ is $OVF_E$.

The conditions of a call admission is as follows. Namely, in the equation (207), assume that:

$$\frac{1}{\sqrt{2\pi}} \int_{-\infty}^{\frac{X-mB}{\sigma_B}} \exp\left(\frac{-Z^2}{2}\right)dz = F_1(P) \quad (209)$$

then, when the value $OVF_B$ which satisfies the regulation of the quality is given, the minimum value P which satisfies the following relationship is determined.

$$m_B + PO\sigma_B \leq 1 - F_1(P) \quad (210)$$

When the minimum value is PO, the condition to judge the call admission which satisfies the probability $OVF_E$ is, referring to the equation (208), as follows:

$$m_E + PO\sigma_E \leq W_{BT} \quad (211)$$

For example, when $OVT_E=10^{-9}$, then PO=6.

Next, the method to determine the call admission by using a cell loss rate is described. In this method, a model used in a queue theory is applied. Assume that the transmission line is a service counter (the number of the counters $S=W_{BT}/CL$), and the buffer is a queue. Then, the distribution of the number of cells in this system is obtained. Here also, the distribution of the number of cells is the Gaussian distribution in accordance with the average and the dispersion of the equations (205). Namely, the probability F(X) of the number of cells below x is:

$$F(X) = \frac{1}{\sqrt{(2\pi)}\sigma_x} \int_{-\infty}^{x} \exp[-(y - m_x)^2/2\sigma x^2]dy \quad (212)$$

Assuming $z=(y-m_x)/\sigma_x$, then the above equation (212) is expressed as:

$$F(X) = \frac{1}{\sqrt{(2\pi)}} \int_{-\infty}^{x} \exp[-z^2/2]dz$$

Here, assuming that:

$$\phi(X) = \frac{1}{\sqrt{(2\pi)}} \int_{-\infty}^{P} \exp[-z^2/2]dz$$

then, the following equation is obtained:

$$F(X) = \phi\left(\frac{X - m_x}{\sigma_x}\right)$$

When the buffer length is M, the evaluation equation is obtained as follows:

$$\begin{aligned}ovfl &= 1 - F(S + M) \\ &= 1 - \phi\left(\frac{S + M - m_x}{\sigma_x}\right)\end{aligned} \quad (213)$$

To obtain the condition to admit a call, a value PO which satisfies the following equation is determined:

$$ovfl = Lc = 1 - \Phi(PO)$$

where Lc is the regulation of the quality with respect to the cell loss rate.

From equation (213), when the following relation is satisfied, the regulation of the quality with respect to the cell loss rate is satisfied:

$$\frac{S + M - m_x}{\sigma_x} \geq PO$$

When $ovfl=10^{-9}$, then PO=6.

Accordingly, the following relation is the condition required to admit a call:

$$m_x + PO \leq S + M \quad (214)$$

The improvement in the efficiency of the utilization of the transmission line will be discussed below.

The following conditions are assumed to compare the efficiencies of the present embodiment and the before described embodiment:

Transmission line speed $W_{ET} = 1.536$ Mb/s
Average speed of data of the call Vav = 11.2 Kb/s
Peak speed of the data of the call Vp = 32 Kb/s
Cell length Cl = 64 bytes.

It is also assumed that all calls have the same average speed and the same peak speed.

In the before described embodiment, $W_{ET}/Vp = 48 < 100$ so that the call is assigned with the peak speed. The number of calls which can be accepted at the same time is 48 calls, at a maximum.

By contrast, according to the present embodiment, by applying the condition of the equation (211) and when it is assumed that PO=6 ($OVF_E = 10^{-9}$), then the maximum number of calls which can be accepted at the same time is 69 calls. Thus, it will be seen that the efficiency is improved in the present embodiment.

Similarly, by applying the condition of the equation (214), and when it is assumed that PO=6 ($OVF_B = 10^{-9}$, and when it is further assumed that the buffer length M=100, then the maximum number of calls which can be accepted at the same time is 72 calls. Thus, it will be seen that the efficiency is improved in the present embodiment.

Figure 15:
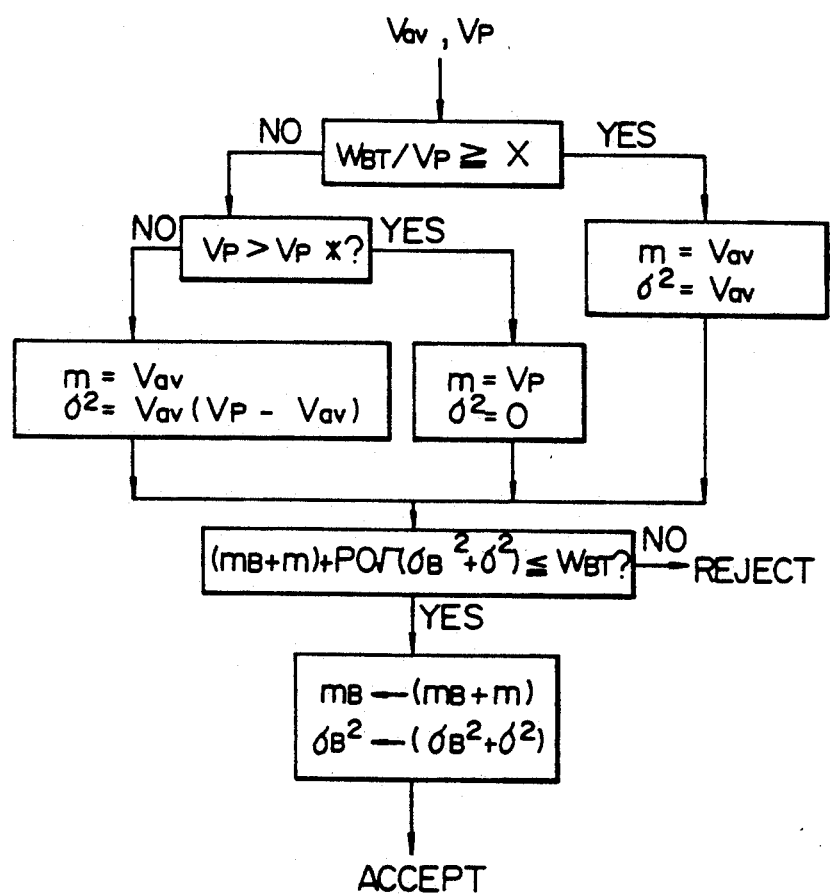
FIG. 15 is a flowchart explaining one aspect of the call admission control shown in FIG. 13.

FIG. 15 is a flowchart explaining the call admission algorithm when the average and the dispersion of the data speeds are used.

In the figure, first, based on the described values of the average speed Vav and the peak speed $V_p$ from the subscriber, the ratio $W_{BT}/Vp$ between the peak speed $W_{Bt}$ of the transmission line and the peak speed Vp of the data from the subscriber and the ratio $W_{BT}/Vp$ between the peak speed of the transmission line and the peak speed of the call from the subscriber are obtained. If the ratio is greater than or equal to 100, the estimation is carried out by the average and the dispersion of data spews from the subscriber, in the same way as in the before described embodiment with reference to FIG. 10. If the ratio $W_{BT}/Vp$ is below 100, the average and the dispersion of the band requested by the subscriber is estimated in accordance with the above equations (201) and (202). In particular, in addition to the condition $W_{BT}/Vp < 100$, if $Vp > Vp100$, where $Vp_\# = [\{(W_{BT}/(N\#Vav) - 1)/PO\}^2 n\# + 1]Vav$, and $n\# = W_{BT}/Vp$, then the average of the band requested is estimated by the peak speed described by the subscriber, and the dispersion is estimated as 0. This is equivalent to the estimation by the peak speed. Note that $Vp_\#$ is the limit value within which the transmission line can be used more efficiently than when the requested band is estimated by the peak speed in accordance with the aforementioned estimation method.

Figure 16:
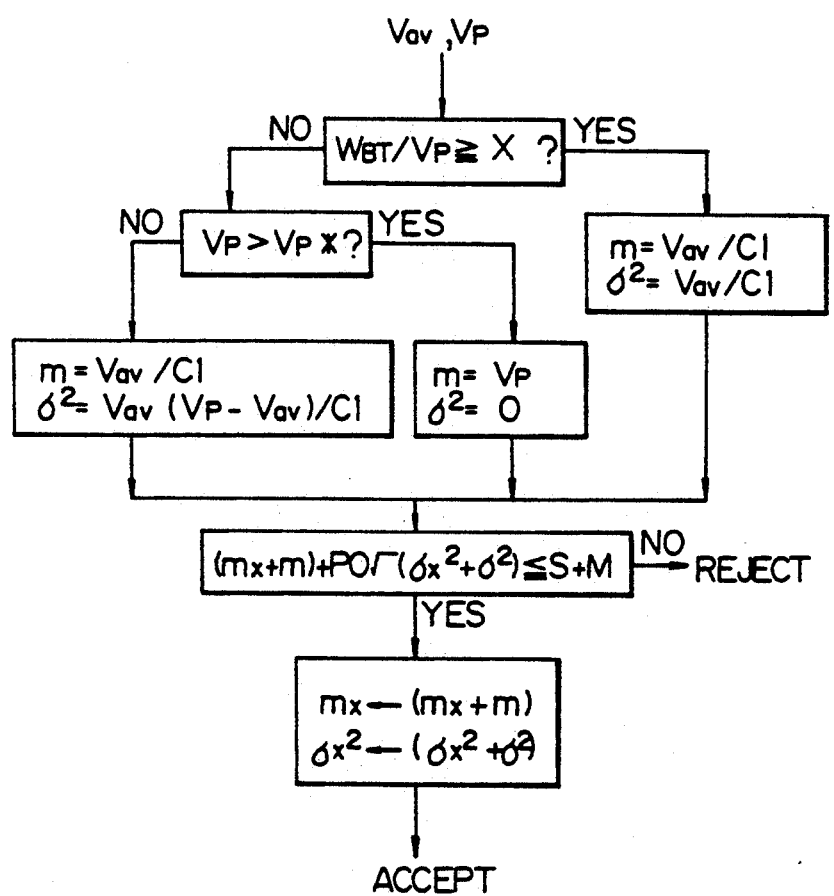
FIG. 16 is a flowchart explaining another aspect of the call admission control shown in FIG. 13.

FIG. 16 is a flowchart explaining the call admission algorithm when the average and the dispersion of the numbers of cells are used.

In the figure, the process is similar to that shown in FIG. 15, and the only difference is that, instead of the average and the dispersion of the data speeds in FIG. 15, the average and the dispersion of the numbers of cells are used. Note that $Vp_\#$ in FIG. 16 is expressed as:

$$Vp_\# = [\{(S+M)Cl/(n\# Vav) - 1)/PO\}^2 n\# + 1]Vav,$$
$$\text{and } n\# = W_{BT}/Vp.$$

Figure 17:
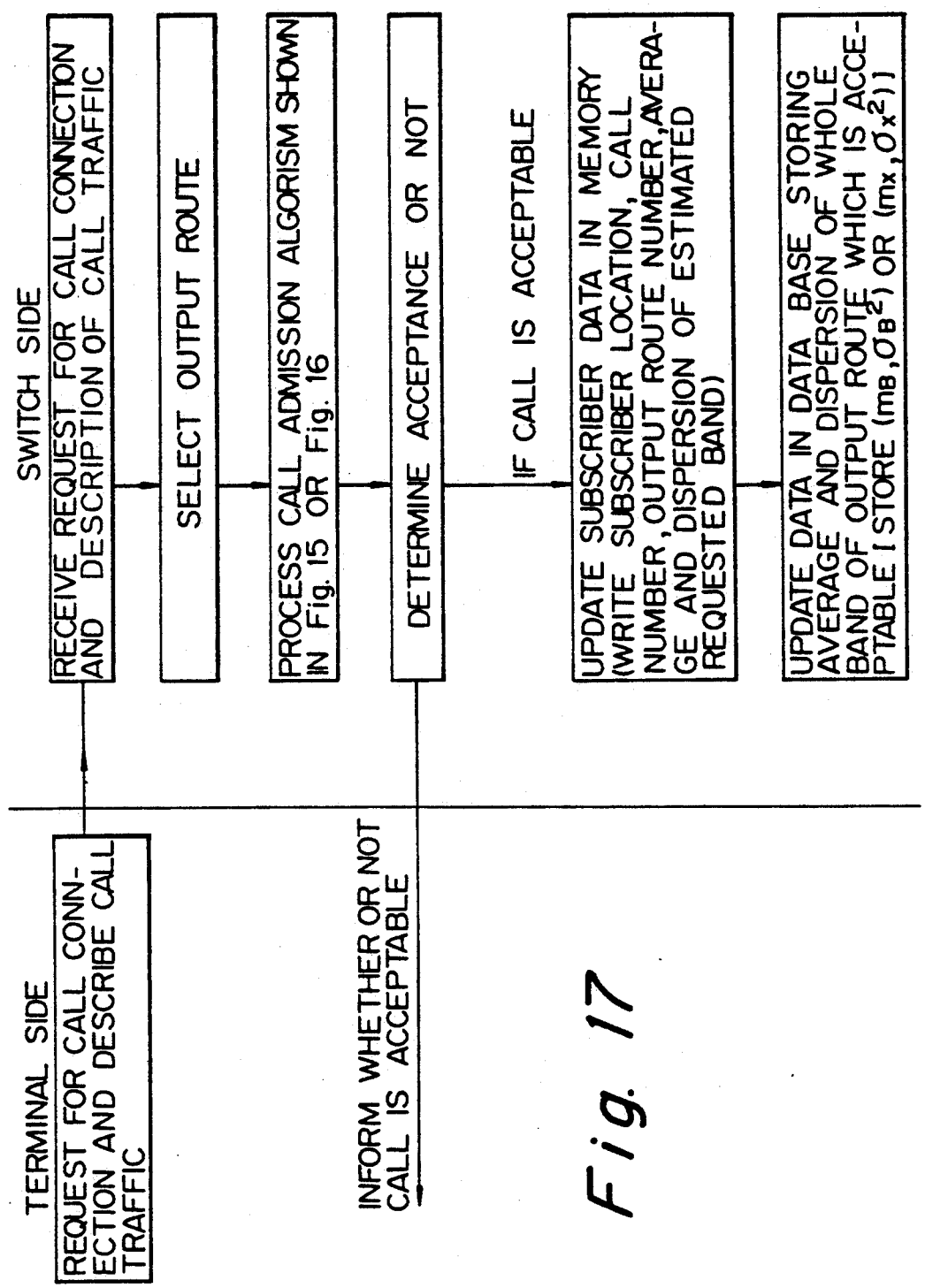
FIG. 17 is a flowchart showing in more detail the call admission control shown in FIG. 13.
Figure 18:
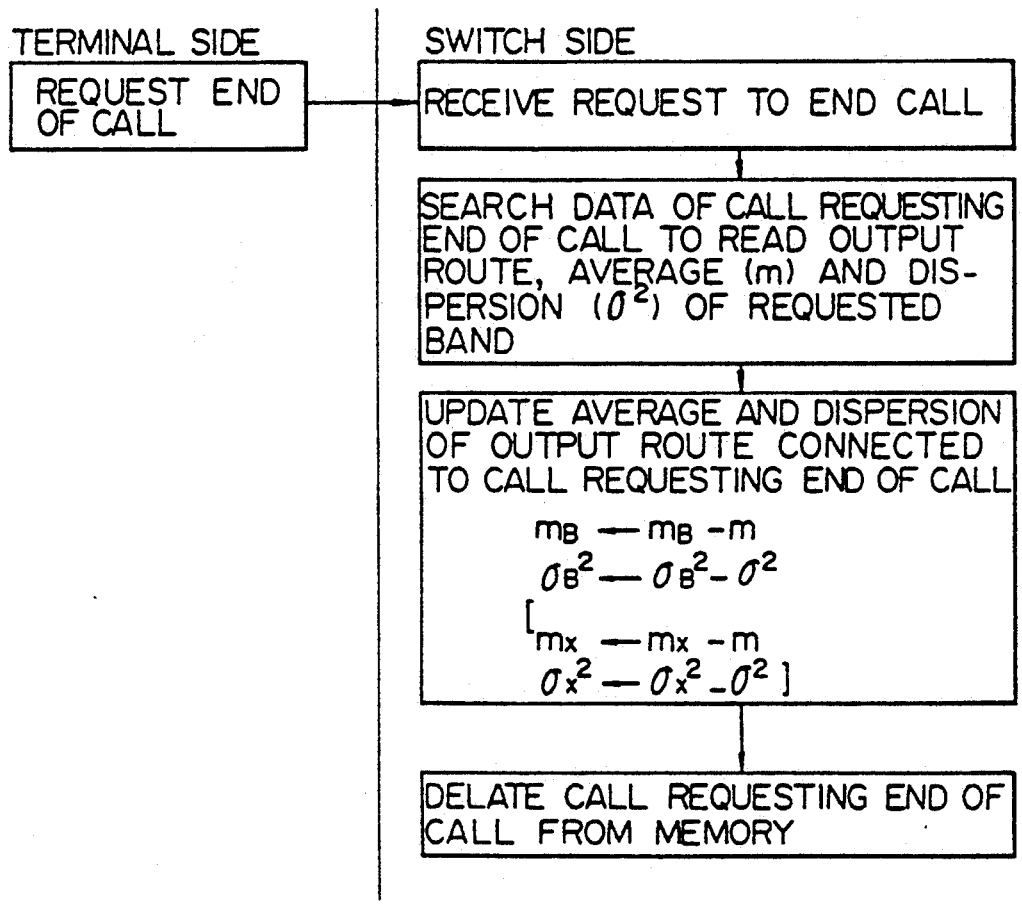
FIg. 18 is a flowchart showing the operation of an end of a call connection after the call admission control shown in FIG. 17.

FIG. 17 shows a flowchart explaining the call admission control according to the above embodiment shown in FIGS. 13 to 16; FIG. 18 shows a flowchart explaining the operation of an end of the call in the embodiment shown in FIGS. 13 to 16; FIG. 19 shows the subscriber data in the data base; and FIG. 20 shows the data of the output route in the data base.

As shown in FIG. 17, when a call connection is requested by a subscriber, the subscriber describes the traffic attribute parameters. The switch side receives the request and the description. Then, possible output highways (transmission lines or output routes) are determined. For each of all of the possible output highways, a judgment is made whether or not the call is acceptable, according to the algorithm shown in FIG. 15 or 16. The result of the judgment is informed to the calling subscriber through a signaling channel. When the call is accepted, the average and the dispersion, stored in the data base, of the selected output route are updated by adding the average and the dispersion of the requested band of the accepted call. Further, in the data base, the subscriber location, the call number, the connection route, and the average and the dispersion of the estimated band are stored as the data for the accepted call from the subscriber as shown in FIG. 19.

At the end of the call, the operation shown in FIG. 18 is almost the same as the operation shown in FIG. 5, and therefore, the description is omitted here.

Next, according to a still further embodiment of the present invention, a congestion control system after a call is accepted will be described.

Figure 21:
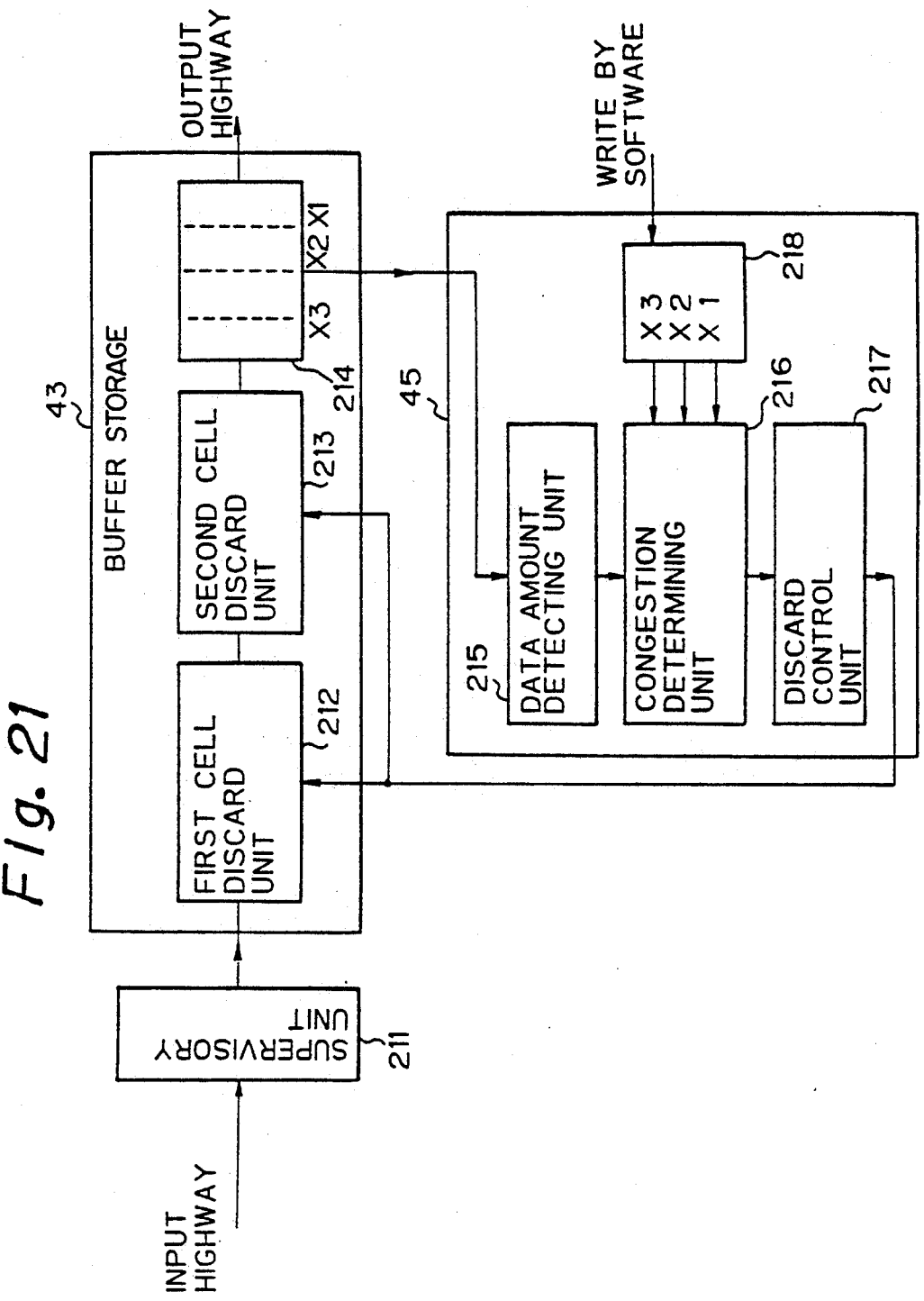
FIG. 21 is a block diagram showing a principle of a congestion control circuit according to a still further embodiment of the present invention.

FIG. 21 shows a principle of the congestion control system according to an embodiment of the present invention. In FIG. 21, 43 denotes the communication path, 212 denotes a first cell discarding unit for discarding marked cells, 213 denotes a second discarding unit for discarding cells having a low priority, 214 denotes a buffer storage, 45 denotes the congestion control unit, 215 denotes a data amount detecting unit for detecting the amount of data per unit time in the buffer storage 214, 216 denotes a congestion determining unit, 217 denotes a discard control unit, 218 denotes a threshold setting unit, and 211 denotes a supervisory unit for applying marking when the values of the attribute parameters of the input cells exceed the values of the described parameters. In FIG. 21, although the supervisory unit 211 is provided at the input side of the communication path 43, the supervisory unit may be provided within the communication path 43.

When congestion of traffic occurs after accepting a call, a cell discard control is carried out according to this embodiment of the present invention to maintain the service quality within the described parameters.

To this end, in operation, the supervisory unit 211 maintains the parameters (e.g. peak speed of data, average speed of data, burst ratio and so forth) described by the subscriber. The cells sent from the subscriber are input to the supervisory unit 211 on the input highway. The supervisory unit 211 is provided with a function for monitoring the amount of entering cells in a unit time (herein after, simply referred to as the amount of data) and applying marking at the header of the cell when the entering cell amount exceeds the described amount. The cell passed through the supervisory unit 211 enters into the communication path 43 and is stored in the buffer storage 214 which forms an ATM switch via the first cell discarding unit 212 and the second cell discarding unit 213. At a reading out timing, they are read out from the head of the buffer storage 214 in order and output to the output highway.

The data amount detecting unit 215 of the congestion control unit 45 detects the amount of data in the buffer storage unit 214 used for storing the cells. The detected amount is input to the congestion determining unit 216. To the congestion determining unit 216, there are input a plurality of threshold values X1, X2 and X3, which divide the capacity of the buffer storage 214. The congestion determining unit 216 determines the range determined by one of the plurality of threshold values in which the amount of data is currently used in the buffer storage 214. The determined result is input to the discard control unit 217. The discard control unit 217 actuates the first cell discarding unit 212 for discarding the marked cells when the amount of data exceeds the threshold value X2. At this condition, if the amount of data is further increased to exceed the threshold value X3, the second cell discarding unit 213 is actuated. The second cell discarding unit 213 has a function to detect the cell which is set with a low priority indication bit ("1") (a cell loss priority bit (CLP)) included in the format according to CCITT recommendation and has the function to discard this cell. When the second cell discarding unit 213 is actuated, the discard control unit 217 is controlled to continue the discard operation when the amount of data is greater than the threshold value X2 and to terminate discard when the amount of data becomes smaller than the threshold value X2. On the other hand, after initiation of the first cell discarding unit 212, it remains active while the amount of data is greater than the threshold value X1 and terminates discard when the amount of data becomes smaller than the threshold value X1.

Figure 23A:
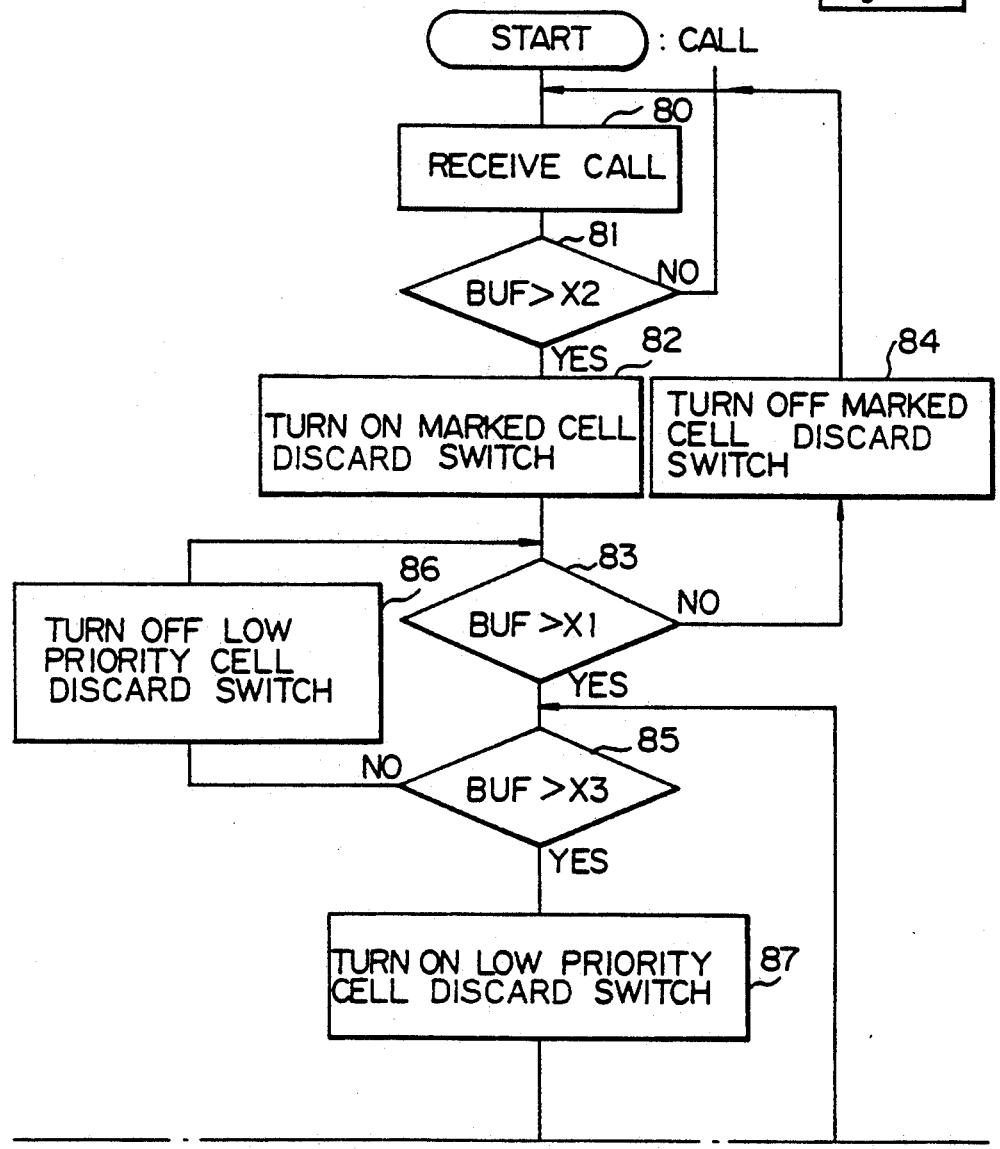
FIG. 23A and FIG. 23B show a flowchart explaining the operation of the congestion control circuit shown in FIG. 22.
Figure 23B:
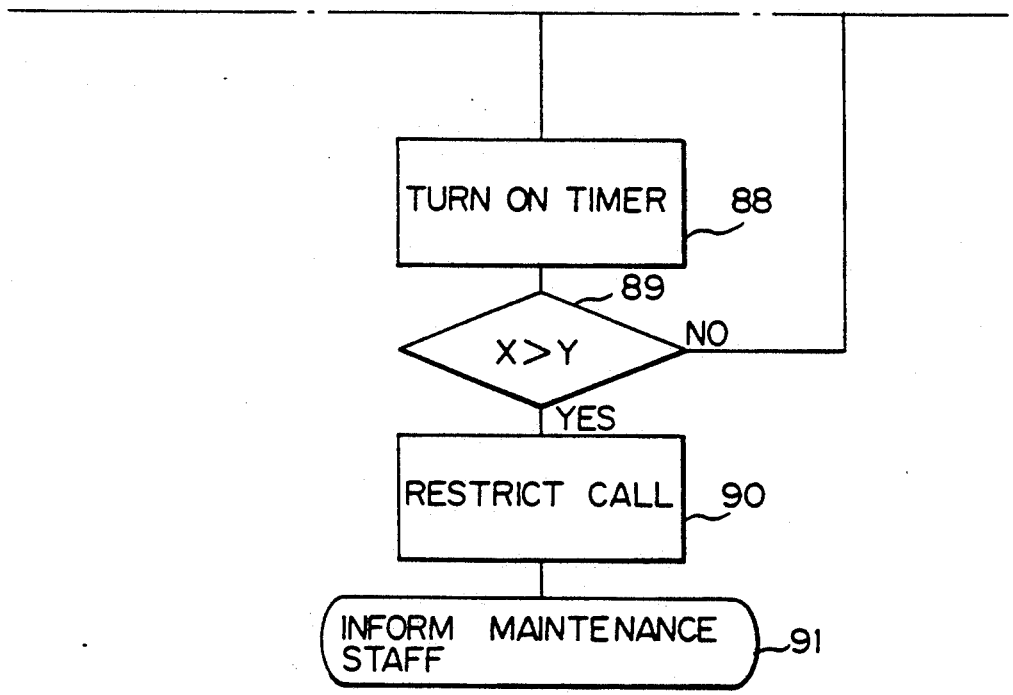
Figure 24:
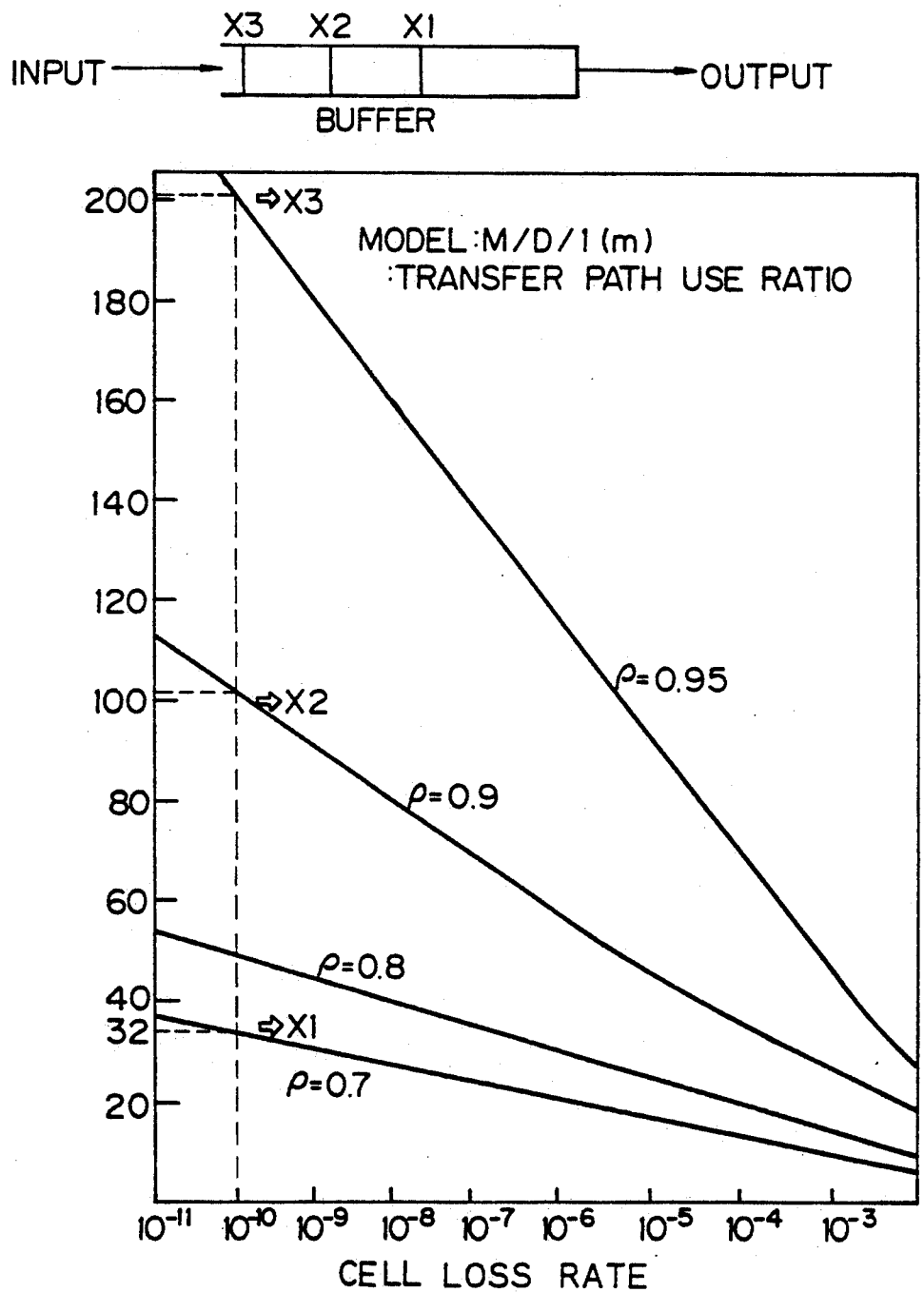
FIG. 24 is a diagram showing the relation between the buffer capacity and the cell loss rate for explaining the determination of the threshold values in the congestion control circuit shown in FIGS. 22.

The congestion control will be further described in more detail with reference to FIG. 22 to FIG. 24.

Figure 22:
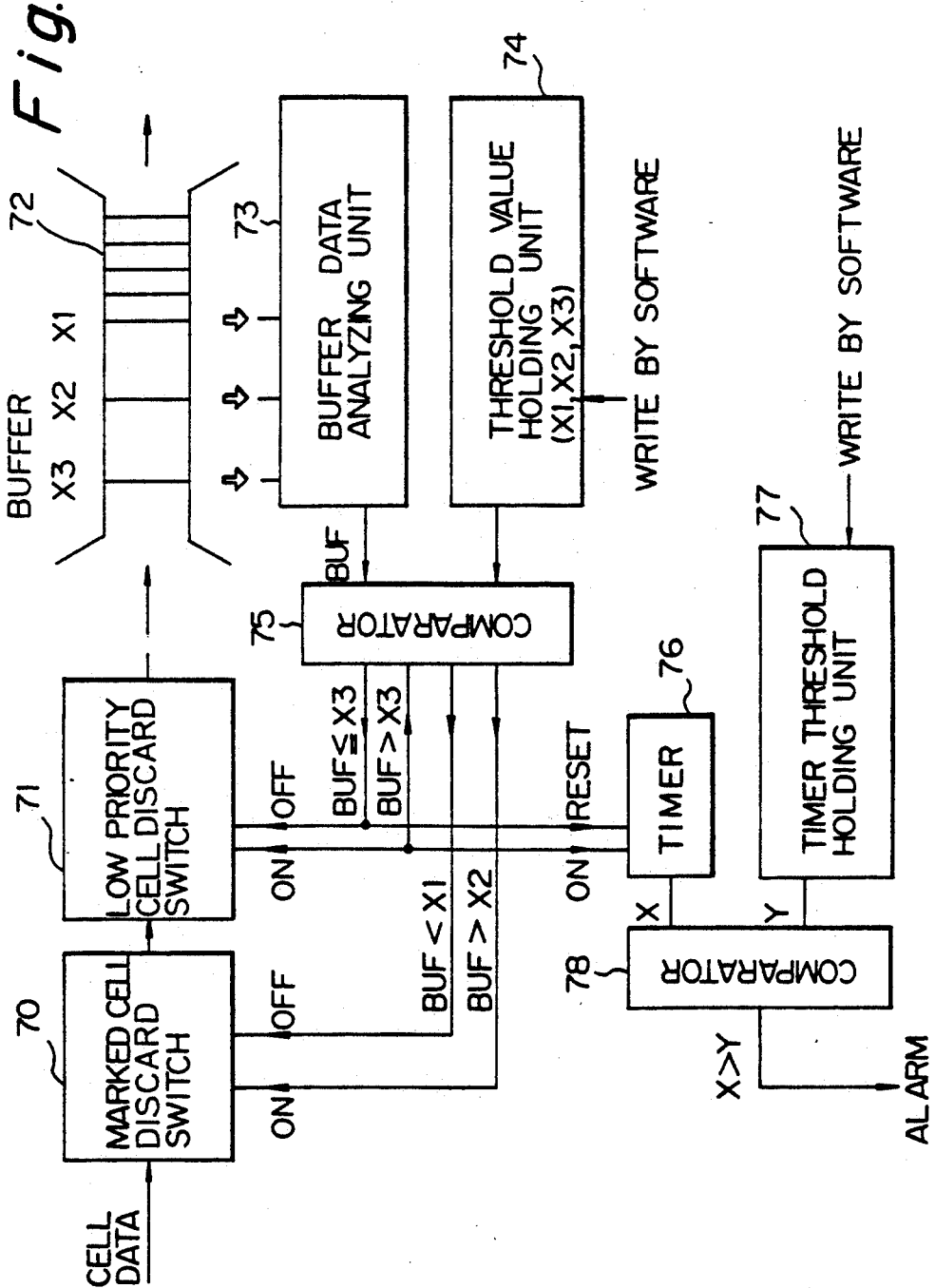
FIG. 22 is a block diagram showing a practical example of the congestion control circuit shown in FIG. 21.

FIG. 22 shows a congestion control system according to an embodiment of the present invention. In FIG. 22, 70 denotes a marked cell discard switch, 71 denotes a low priority cell discard switch, 72 denotes a buffer, 73 denotes a buffer data analyzing unit, 74 denotes a threshold value holding unit, 75 denotes a comparator circuit, 76 denotes a timer, 77 denotes a timer threshold holding unit, and 78 denotes a comparator circuit. It should be noted that, before the cell data is input to the circuit in FIG. 22, a process is performed by the supervisory circuit or a policing circuit for or applying a mark on the cell having parameters exceeding the subscriber's described parameters such as the peak speed of data, or average speed of data.

The operation of the congestion control system shown in FIG. 22 will be described with reference to the flowchart of congestion control in FIG. 23A and FIG. 23B.

At first, at step 80, the admission of the call is performed. Then, the requesting call is input to the ATM communication path 43 shown in FIG. 8 and subsequently input to the buffer storage 72 of the switch shown in FIG. 22.

Once the buffer storage 72 accumulates the cells, analysis of the amount of data is carried out by detecting the difference between the read out address and the write in address of buffer storage. The detected amount of data is output to the comparator circuit 75. In the threshold holding unit 74, three threshold values X3, X2, and X1 (where X3>X2>X1), respectively representing the buffer amount, are held. The threshold values are compared with the amount of data output from the buffer data analyzing unit 73 by the comparator 75.

At step 81, when the comparator 75 detects that the amount of data (referred to as BUF) in the buffer storage 72 exceeds the threshold value X2, the comparator 75 outputs an output for turning on the marked cell discarding switch 70 at step 82. By this process the marked cells are discarded and other cells are input to the buffer storage 72 and output from the buffer storage 72 at the reading out timing.

Thereafter, at step 83, a determination is made at the comparator 75 whether amount of data (BUF) exceeds the threshold value X1. If not exceeded, at step 94, the marked cell discard switch 70 is turned off. If exceeded, then, at step 85, a determination is performed by the comparator 75 whether the amount of data BUF exceeds the threshold value X2. If not, when the low priority cell discarding switch 71 is in an ON state, it is turned off at step 86, and the process returns to the step 83.

At the step 85, if the amount of data exceeds the threshold value X3, the low priority cell discarding switch 71 is turned on at step 87, and subsequently the timer 76 is initiated. Then, at step 89, the value X representing an elapsed time given by the timer 76 is compared with the threshold value Y held in the timer threshold holding unit 77 by the comparator 78. If the value X exceeds the threshold value Y, it means that the condition for discarding the low priority cells in addition to the discard of marked cells has been maintained over a predetermined period corresponding to the threshold value Y.

In a normal operation, the amount of data should vary, in the reducing direction, by performing the discard of the cells so that the amount of data should become smaller than the threshold value X3 at step 85 after a certain period has been passed. Therefore, if the decision at step 89 is YES, it means that there is an occurrence of abnormality. In such a case, at step 90, a restriction is made on requests for calls. At the same time a step 91, an alarm is given to a maintenance staff. Even when the timer 76 is turned on, the process returns to step 85 as long as the elapsed time is within the period of the threshold value Y. When the amount of data becomes smaller than or equal to the threshold value X3, the low priority cell discarding switch 71 is turned off.

Thus, by controlling the marked cell discarding switch 70 and the low priority cell discarding switch 71, it becomes possible to minimize the delay without increasing the capacity of the buffer by discarding the necessary minimum number of cells.

Next, the manner of deriving each threshold values X1 to X3 of the buffer storage 72 will be discussed with reference to FIG. 24.

The threshold values of the buffer are set in such a way that the marked cells are discarded when the amount of data exceeds X2; the discard is terminated when the amount of data is below X1; and an abnormality is detected when the amount of data exceeds the value X3. As a measure of X2, it is set at an amount of data in the buffer storage satisfying the cell loss rate $10^{-10}$. In such case, the relationship between the cell loss rate and the amount of data in the buffer storage as derived through a traffic calculation utilizing the M/D/I (m) model becomes as illustrated in FIG. 24. By utilizing this graph, the thresholds X1 to X3 are determined as follows:

X1 = 32 cells (when the transfer path use ratio $\rho = 0.7$)

X2=100 cells (when the transfer path use ratio ρ=0.9)

X3=200 cells (when the transfer path use ratio ρ=0.95)

According to the embodiment of the present invention shown in FIGS. 8 to 24, when a request for a call occurs in the ATM switching system, since it becomes possible to determine whether the band has enough vacancy by an assignment method corresponding to the characteristics of the requesting call defined by the described parameters, the possibility of the occurrence of the discard of cells and the increasing of delay can be minimized. Also, since the influence of the requesting call for other ongoing calls in communication is minimized, the service quality can be improved. Furthermore, the algorithm for the admission of a call does not require a completed arithmetic operation and this enables high speed processing.

In addition, in the traffic control for the ATM switching system, discard of the cells having parameters which are below the described parameters is effected with priority, and a discard of the low priority cell is initiated only at higher congestion. This reduces the possibility of the discard of the cells within the described parameters and lowers the need for expansion of the buffer capacity.

In the above described embodiment, the priority control is effected in front of the buffer storage, however, according to a still further embodiment of the present invention, the priority control may be effected within the buffer storage or at the output portion of the buffer storage. This embodiment will be described with reference to FIGS. 25 to 32.

Figure 25:
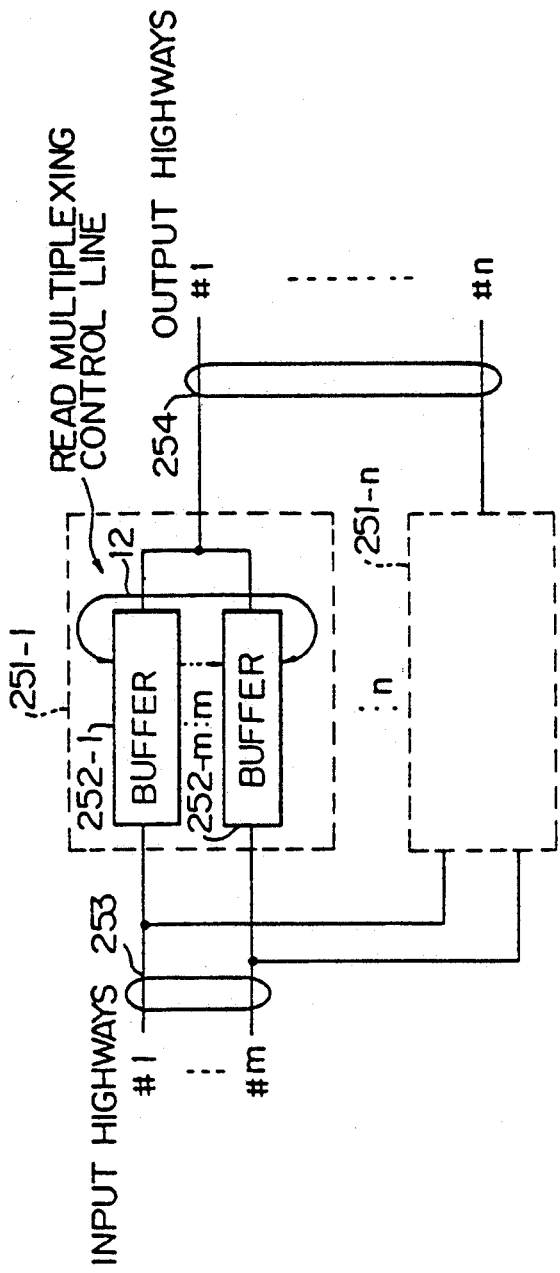
FIG. 25 is a block diagram showing the principle of a priority control apparatus according to a still further embodiment of the present invention.
Figure 26:
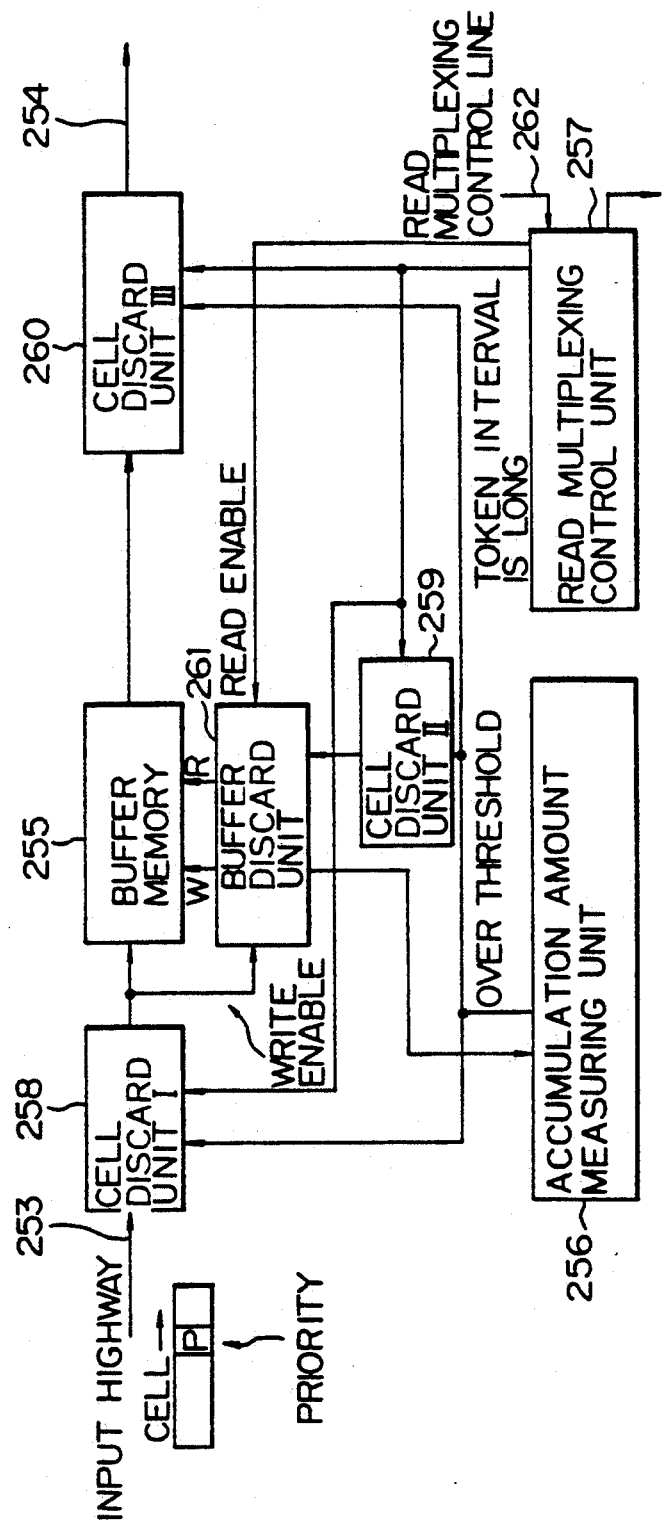
FIG. 26 is a block diagram showing the construction of a buffer unit shown in FIG. 25.

FIG. 25 shows the principle of the priority control system according to the embodiment of the present invention. In FIG. 26, the construction of a communication path is shown. The ATM communication path according to the embodiment of the present invention includes a plurality of highways 253, a plurality of output highways 254, and a plurality of communication blocks 251-1 to 251-n for passing cells input from the input highways 253 through desired paths to the output highways 254. Each communication block comprises buffer units 252-1 to 252-m each corresponding respectively to one of the output highways #1 to #n. The number of the buffer units 252-1 to 252-m is the same as the number of the input highways #1 to #m.

FIG. 26 shows the construction of one of the buffer units 252-1 to 252-m shown in FIG. 25. As shown in FIG. 26, each buffer unit comprises a buffer memory 255, an accumulation measuring unit 256 for measuring the amount of cells accumulated in the buffer memory 255, and a cell discard unit 258, 259, or 260. In the accumulation measuring unit 256, when the amount of cells accumulated in the buffer memory 256 exceeds a predetermined cell accumulation amount, a cell having a low priority is discarded by the cell discard unit 258, 259, or 260.

It is possible to connect the buffer units through a read multiplexing line 254 through which a token, which provides a right i.e., permission for reading out, is circulated. A read multiplexing control unit 257 is provided to control the discard of a low priority cell when the arrival interval exceeds a predetermined token arrival interval.

It is preferable to discard the cells having low priority on the input highway before they are written into the buffer memory 255.

It may also be preferably to discard the low priority cells already accumulated in the buffer memory 255.

It may further be preferable to discard the low priority cells at the output of the buffer memory 255.

By providing the cell accumulation measuring unit 256 and the cell discard unit 258, 250, or 260, only one buffer memory 255 is needed in each buffer unit, even when there are a plurality of levels of priorities. Therefore, not only is the hardware in the buffer unit simplified, but also the reading control is simplified because it is not necessary to control the reading order, as was required in the conventional reading control method.

Figure 27:
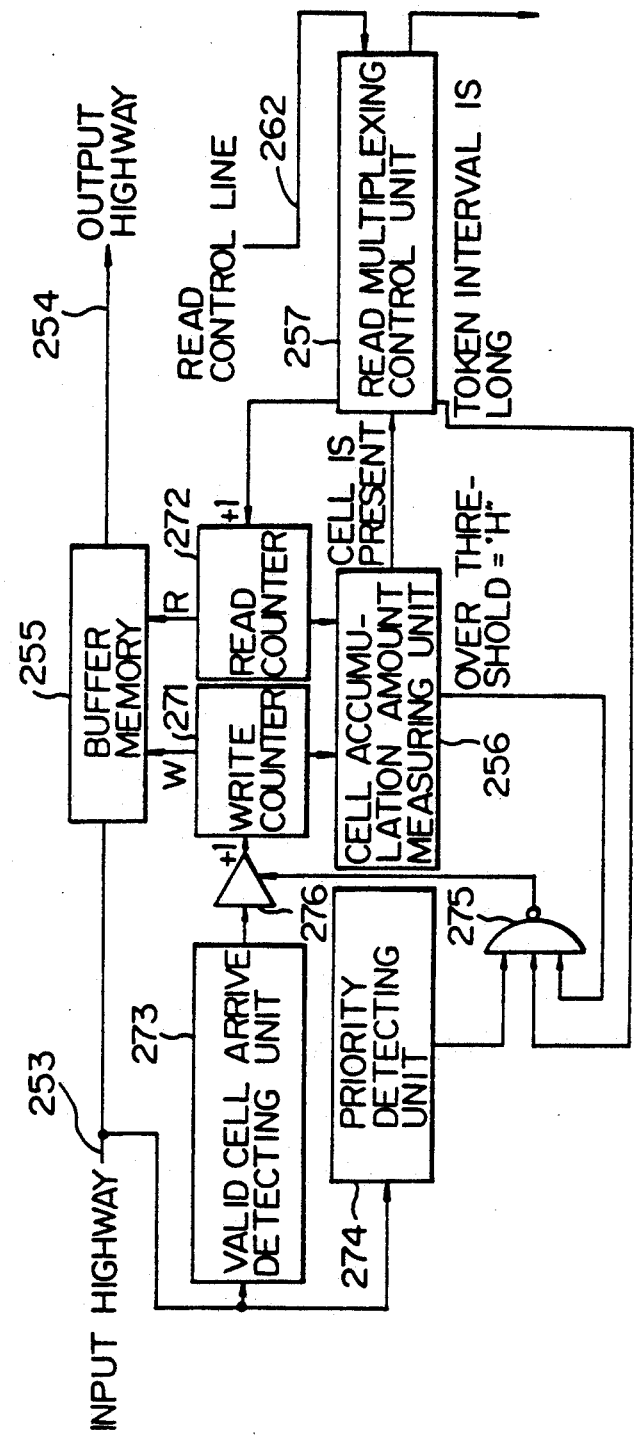
FIG. 27 is a block diagram showing the buffer unit shown in FIG. 26 in more detail.

FIG. 27 is a block diagram showing one practical example of the buffer unit shown in FIG. 26. On FIG. 27, 271 denotes a write counter, 272 denotes a read counter, 273 denotes a valid cell arrival detecting unit, 274 denotes a priority detecting unit which outputs high level when an input cell has a low priority, 275 denotes a NAND gate which receives outputs from the priority detecting unit 274, the cell accumulation measuring unit 256 and the read multiplexing control unit 257, and 276 denotes a gate which selectively permits and blocks passing of the valid cell output from the valid cell arrival detecting unit 273, depending upon the output of the NAND gate 275.

In the embodiment shown in FIG. 27, when the cell accumulation amount, as measured by the cell accumulation measuring unit 256, exceeds a predetermined accumulation amount (threshold value), when the arrival interval of the token exceeds a predetermined period, and when the priority (i.e., the priority depending upon cell loss characteristics of the input effective cell at the input side of the buffer is a low priority, the NAND gate output s a low level for making the gate 26 inhibit passing of the output of the effective cell arrival detecting means 23. By this arrangement a writing pulse for low priority cell is not sent to the write counter 21. Therefore, writing in of the cell to the buffer unit is prevented by discarding the corresponding cell.

Figure 28:
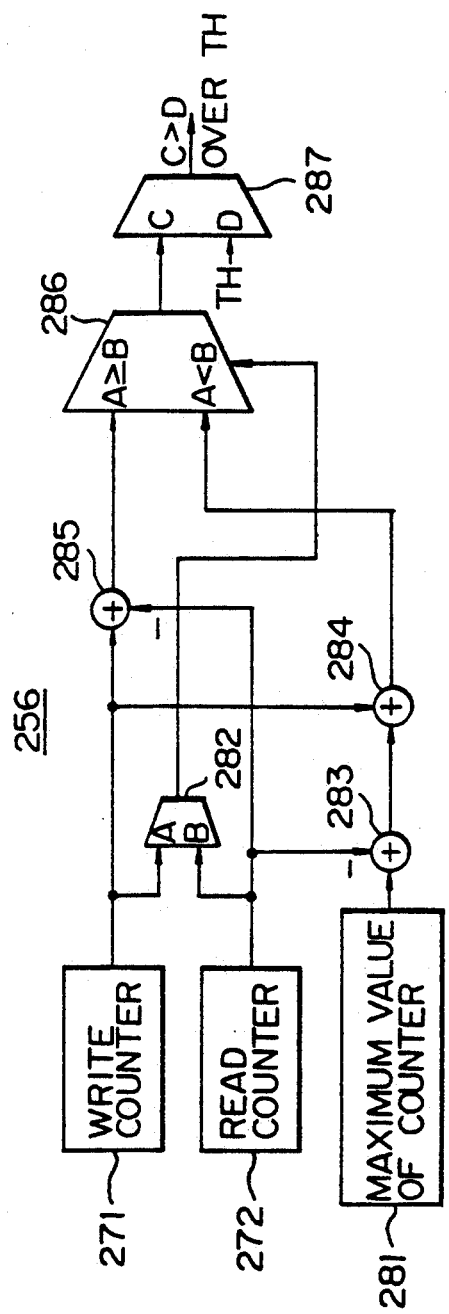
FIG. 28 is a block diagram showing the cell accumulation amount measuring unit in the buffer unit shown in FIG. 27.

FIG. 28 shows the construction of the cell accumulation measuring unit 256 in the buffer unit shown in FIG. 27. In FIG. 28, 281 denotes a unit for outputting the maximum value of the counter, 282 denotes a comparator, 283 denotes a subtracter for subtracting the counter value of the read counter 272 from the maximum counter value, 284 denotes an adder for adding the output of the write counter 271 and the output of the subtracter 283, 285 denotes a subtracter for subtracting the counter value B of the read counter 272 from the counter value A of the write counter 271, 286 denotes a selector for selecting one of the output of the subtracter 285 and the adder 284, and 287 denotes a comparator for comparing the output of the selector 286 with a predetermined threshold value.

In the normal state, when the buffer memory 255 (FIG. 27) is operated in a first-in first out (FIFO) operation, it becomes necessary to measure the cell accumulation amount with respect to both of the write counter and the read counter since the counter value A of the write counter 271 and the counter value B of the read counter 272 are different from each other. According to the shown embodiment, when $A \geq B$, a complement of A and B is added by the subtracter 285. On the other hand, when $A < B$, the maximum value of the counter 281 and the complement of the value B are added by the subtracter 283 and subsequently the resultant value is added to the value A by the adder 284. Either one of the results of the aforementioned two processes of calculations is selected by the comparator 286, depending upon relationship of the values A and B, to output the cell accumulation amount. The accumulated amount of the cells thus derived is compared with the predetermined cell amount (threshold value) by the comparator 287. When the accumulated cell amount is greater than the threshold value, a signal is fed to the cell discarding unit.

Figure 29:
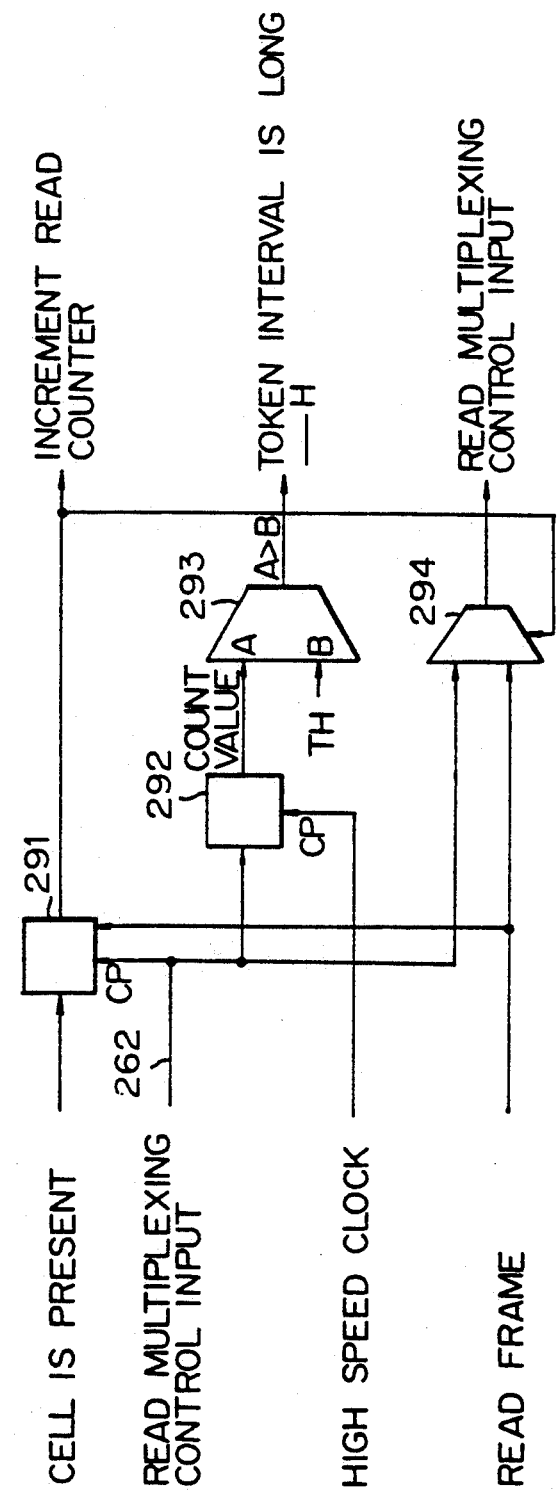
FIG. 29 is a block diagram showing the read multiplexing control unit in the buffer unit shown in FIG. 27.

FIG. 29 shows the construction of the reading multiplexing control unit 257 in the buffer unit shown in FIG. 26. In FIG. 29, 291 denotes a register which latches the information, indicative of the presence of cells from the cell accumulation measuring unit 256, in response to receipt of the token through the reading out multiplexing line 262 and resets the content in response to the leading edge of a frame indicative of the cell length which is transferred through the reading out multiplexing line control 262, 292 denotes a counter for measuring the interval of tokens, 293 denotes a comparator for comparing the counter value of the counter 292 with a predetermined threshold value, and 294 denotes a selector for outputting the token on the reading out multiplexing control line 262 when the output indicative of the presence of cells is provided from the register 291 and otherwise for outputting only a read out frame.

FIG. 30 is a timing chart showing the operation of the reading out multiplexing unit 257 shown in FIG. 29. With reference to FIGS. 29 and 30, the operation of the reading out multiplexing unit 257 will be discussed below.

When a token is input through the reading out multiplexing control line 12 for providing a right of (i.e., permission for) reading out, information concerning the presence or absence of a cell in the buffer memory 255 from the cell accumulation measuring unit 256 (FIG. 26) is latched in the register 291. If a cell exists in the buffer memory 255, a signal is sent from the register to the read counter 272 to increment its counter value and thereby read out the cell to the highway. Simultaneously with this reading out operation, the token is transferred to the next stage of the buffer unit via the multiplexing control line 262.

When there is no cell in the buffer memory 255, the input token is immediately sent through the read multiplexing control line 261 to the next stage buffer memory.

Namely, when the cells are uniformly accumulated in the buffer memories provided between the output highway and the inptu highways, the number of the buffer memories being the same as the number of the input highways for avoiding a collision between cells, the arrival interval of the token becomes longer. In contrast, when the cells are concentrated to particular memories, the arrival interval of the token becomes shorter. By this process, the occupied ratio of each output highway can be determined at a respective buffer memory. This enables distribution of control. Also, this avoids the possibility of unnecessary or erroneous discard of cells which can otherwise be caused despite the presence of vacancy in the output highway. Detection of the occupied ratio of the output highway is carried out by inputting the token to the load of the counter 292, comparing the counter value, as counted up until the next arrival of the token with a predetermined threshold value, and outputting a high level signal to the NAND gate 275 when the counter value is greater than or equal to the threshold value.

Figure 31B:
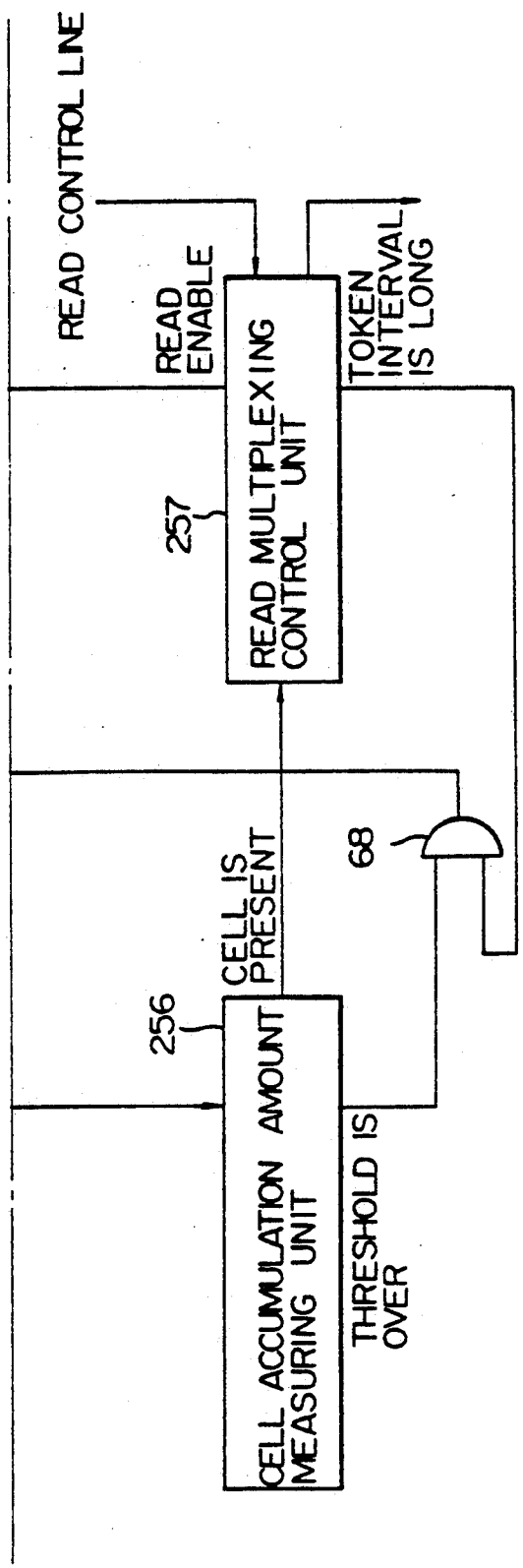

FIG. 31A and FIG. 31B show a block diagram of the buffer unit according to another embodiment of the present invention. In FIGS. 31A and 31B, 331 denotes a priority detecting unit, 322 denotes an effective (i.e., "valid") cell arrival detecting unit, 333 denotes a selector, 334 is empty address storing memory, 335 denotes a high priority cell address storage memory, 336 denotes a low priority cell address storage memory, and 337 denotes a selector.

In this embodiment, when the accumulated cell amount in the buffer memory exceeds a predetermined accumulation amount (threshold value), and when the arrival interval of the token for obtaining a right to read out, through the reading out multiplexing control line, is longer than a predetermined period, only low priority cells are discarded among the cells written in the buffer memory.

Namely, an address of an empty area in the buffer memory 255 is written, in advance, in the empty address storing memory 334. When the arrival of a valid cell is detected by the valid cell arrival detecting unit 332, the empty address is read out from the empty address storing memory 334, thereby to write in the cell to the buffer memory identified by the read out address information. Also, the address of the cell is written in one of the address storage memory (FIFO) 335 or 336 depending upon the priority given to the cell. The cells thus accumulated in the buffer memory 255 are output, in order by reading out the addresses. After reading out, the address, which becomes an empty address by outputting the cell, is again written in the empty address storage memory 334. Here, when the cell accumulation measuring unit 256 detects the accumulated cell amount exceeding the threshold value and when the arrival interval of the token, longer than the predetermined threshold value, is detected by the read out multiplexing control device 7, the low priority cell address storage memory 336 is reset and the addresses therein are transferred to the empty address storage memory 334. By this process, only the low priority cells in the buffer memory 255 can be discarded.

Figure 32B:
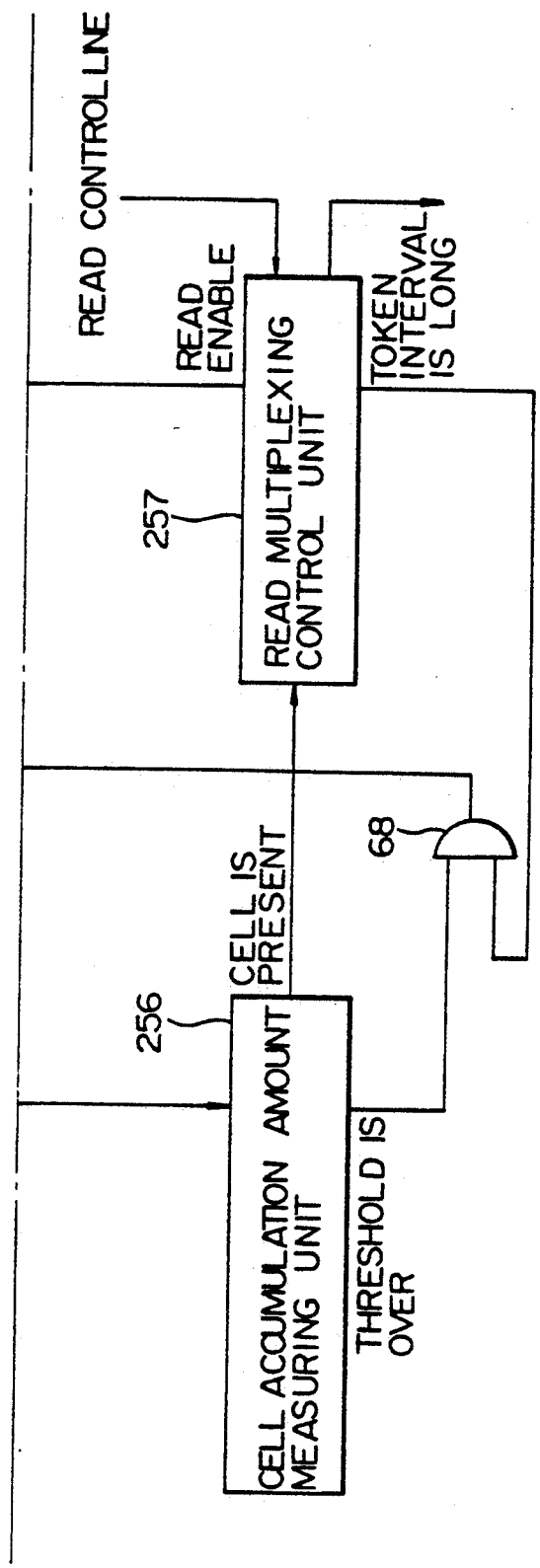

FIG. 32A and FIG. 32B show a block diagram of the buffer unit according to a still further embodiment of the present invention.

In the figures, similarly to the embodiment shown in FIGS. 31A and 31B, when the accumulated cell amount in the buffer memory exceeds the predetermined accumulation amount (threshold value), and when the arrival interval of the token is longer than the predetermined period, only the low priority cells are discarded among the cells read out from the buffer memory.

The construction of this embodiment is essentially the same as that of the above described embodiment.

The only difference between FIGS. 31A and 31B and FIGS. 32A and 32B is that, instead of resetting the low priority cell address storage memory 336 as in the above embodiment, the address in the low priority cell address storage memory 336, to be read out in the next order is read out without reading out the cell by providing a read-out signal through an OR gate 338 when the accumulated cell amount exceeds the threshold value and when the arrival interval of the token is longer than the threshold value, and then the corresponding address are transferred to the empty address storage memory 334. By this process, the cells having a high priority are transferred with a higher priority through the output highway.

As can be clear from the above discussion given, and according to the embodiments shown in FIG. 25 to FIG 33B, by providing the cell accumulation measuring unit and the reading out multiplexing control unit for measuring the arrival interval of the token, only a single buffer memory is required in the buffer unit irrespective of the priorities of the cells.

Therefore, it becomes unnecessary to provide a plurality of buffer memories for selectively storing the cells depending upon their priority and thus enables a substantial reduction of the hardware.

Furthermore, concerning cell loss rate, by discarding cells having a low priority thereby to restrict an overloading condition of the network, satisfactory cell loss rate characteristics can be achieved for the high priority cells.

In addition, since the above described embodiments measure the cell accumulation amount in the communication route and perform discard control depending upon the token interval in the reading out multiplexing control, it becomes possible to respond to temporary fluctuations of the burst track. Furthermore, since the above embodiments enable judgment of the occupied ratio of the output highway at each buffer unit, distribution of controls becomes possible. In addition, it becomes possible to avoid erroneous discard of the cells despite the presence of available output highways.

We claim:

1. A call admission control system in an asynchronous transfer mode exchange for converting input data from a subscriber terminal into cells, each with data of a fixed length, and for statistically multiplexing and exchanging the cells for output thereby to an output route, comprising:

attribute parameter description means for describing attribute parameters of a call from the subscriber terminal upon the occurrence of a request, for connection of the call, from the subscriber terminal to another terminal and wherein said attribute parameters, described by said attribute parameter description means, comprise at least three parameters selected from the peak speed, average speed, burst period, idle period between burst periods, number of cells generated during the burst period, and burst ratio attribute parameters, of the data from the subscriber terminal which is requesting the call connection;

average and dispersion calculating means, operatively connected to the attribute parameter description means, for calculating, based on the attribute parameters described by the attribute parameter description means, an average and a dispersion of the traffic speeds of the data in the call;

data managing means, operatively connected to the average and dispersion calculating means, for storing and managing data of the average and the dispersion on each output route and data relating to each subscriber;

total average and total dispersion calculating means, operatively connected to the average and dispersion calculating means, for calculating a total average and a total dispersion of the data speeds on the output route selected by said asynchronous transfer mode exchange, when said call which is requesting the connection is added to the existing calls, based on the average and the dispersion of the added call calculated by said average and dispersion calculating means, and the average and the dispersion of the existing calls on the selected output route managed by said data managing means; and cell loss rate and end-to-end delay evaluation means, operatively connected to said total average and total dispersion calculating means, for calculating prediction values of cell loss rate and end-to-end delay based on the average and the dispersion on said selected output route calculated by said total average and dispersion calculating means and for comparing the prediction values with the required service quality, of cell loss rate and the required end-to end delay, and thereby for determining whether or not the call which is requesting the connection is acceptable, for being connected.

2. A call admission control system as claimed in claim 1, wherein said average and dispersion calculating means comprises means for calculating said average and said dispersion of the data speed, for the call which is requesting the call connection, based on the three parameters of peak speed, burst period, and idle period attribute parameters described by said attribute parameter description means.

3. A call admission control system as claimed in claim 1, wherein said average and dispersion calculating means comprises means for calculating said average and said dispersion of the data speed, for the call which is requesting the call connection, based on the average speed, number of cells generated during the burst period, and burst ratio attribute parameters described by said attribute parameter description means.

4. A call admission control system as claimed in claim 1, wherein said average and dispersion calculating means comprises means for calculating said average and said dispersion of the data speed, for the call which is requesting the call connection, based on the peak speed, burst period, and burst ratio attribute parameters described by said attribute parameter description means.

5. A call admission control system as claimed in claim 1, wherein said average and dispersion calculating means comprises means for calculating said average and said dispersion of the data speed, for the call which is requesting the call connection, based on the peak speed, average speed, and burst period attribute parameters described by said attribute parameter description means.

6. A call admission control system as claimed in claim 1, wherein said average and dispersion calculating means comprise means for calculating said average and said dispersion of the data speed, for the call which is requesting the call connection, based on the peak speed, average speed, and number of cells generated during a burst period attribute parameters described by said attribute parameter description means.

7. A call admission control system in an asynchronous transfer mode exchange which receives a description of the attribute parameters of traffic, upon a reception of a call from a subscriber terminal, requesting a connection through a transmission line to another subscriber terminal, comprising:

a memory for storing a standard data speed in said transmission line, a sum of the peak speeds of all calls wherein the peak speeds are previously assigned in said transmission line, and a sum of the average speeds of all calls wherein the average speeds are previously assigned in said transmission line;

calculating means for calculating, based on said description of attribute parameters, an average and a dispersion of data speeds of the call which is requesting a call connection through said transmission line and wherein said attribute parameters comprise at least three parameters selected from the peak speed Vp, average speed Vav, burst period $\alpha^{-1}$, idle period $\beta^{-1}$, number Nc of cells generated during the burst period $\alpha^{-1}$, and burst ratio Rb, of data from the subscriber terminal which is requesting the call connection, and wherein said average and dispersion calculating means comprises means for calculating said average a and said dispersion v based on the following equation:

$$a = Vav/Vt$$

$$v = A \times (2Nc - 1) \times 1 - Vav/Vp)$$

where Vt is the regulated speed of the transmission line;

band assignment determining means, operatively connected to said memory and to said calculating means, for determining whether said call with the average speed or said call with the peak speed is to be assigned, based on the calculated values of the average and the dispersion and values stored in said memory; and assignment evaluation means, operatively connected to said band assignment determining means, for determining, in response to the assignment of the call, whether the assigned call is acceptable for being transferred.

8. A call admission control system as claimed in claim 7, wherein said attribute parameters described by said subscriber terminal which is requesting the call connection comprise the average speed Vav, the number of cells Nc generated during a burst period, and the peak speed Vp.

9. A call admission control system as claimed in claim 7, wherein said attribute parameters described by said subscriber terminal which is requesting the call connection comprise the peak speed up Vp, the burst period $\alpha^{-1}$, and the idle period $\beta^{-1}$, said average and said dispersion of the call being calculated by obtaining the number of cells Nc and the average speed Vav from the following equations:

$$Nc = Vp \times \alpha^{-1}/CL$$

$$Vav = Vp \times \alpha^{-1}/(\alpha^{-1} + \beta^{-1}).$$

10. A call admission control system as claimed in claim 7, wherein said attribute parameters described by said subscriber terminal which is requesting the call connection comprise the average speed Vav, the number Nc of cells generated during a burst period $\alpha^{-1}$, and the burst ratio Rb, said average and said dispersion of the call being calculated by obtaining the number of cells Nc and the average speed Vav from the following equation:

$$Vp = Vav/Rb.$$

11. A call admission control system as claimed in claim 7, wherein said attribute parameters described by said subscriber terminal which is requesting the call connection are the peak speed Vp, the burst period $\alpha^{-1}$, and the average data speed Vav, said average and said dispersion of the call being calculated by obtaining the number of cells Nc and the average speed Vav from the following equation:

$$Nc = Vp \times \alpha^{-1}/CL$$

where Cl is the cell length.

12. A call admission control system as claimed in claim 7, wherein said attribute parameters described by said subscriber terminal which is requesting the call connection comprise the peak speed Vp, the burst period $\alpha^{-1}$, and the burst rate Rb, said average and said dispersion of the call being calculated by obtaining the number of cells Nc and the average speed Vav from the following equation:

$$Vav = (1 - Rb) \times Vp.$$

13. A call admission control system in an asynchronous transfer mode exchange which receives a description of parameters of traffic, upon reception of a call, through a transmission line to another subscriber terminal, comprising:

a memory for storing a standard data speed in said transmission line, a sum of the peak speeds of all calls wherein the peak speeds are previously assigned in said transmission line, and a sum of the average speeds of all calls wherein the average speeds are previously assigned in said transmission line;

calculating means for calculating, based on said description of parameters, an average and a dispersion of data speeds of the call which is requesting a call connection through said transmission line;

band assignment determining means, operatively connected to said memory and to said calculating means, for determining whether said call with the average speed or said call with the peak speed is to be assigned, based on the calculated values of the average and the dispersion and values stored in said memory;

assignment evaluation means, operatively connected to said band assignment determining means, for determining, in response to the assignment of the call, whether the assigned call is acceptable for being transferred; and said band assignment determining means comprising comparison means for comparing (Vt-Vpht) and X, where Vt is the regulated speed of the transmission line, Vpht is the sum of peak speeds of all calls already assigned with peak speeds, and X is the minimum number of calls possible to be assigned with average speeds, whereby when the value (Vt−Vpht) is smaller than the value X, the call is assigned with the peak speed.

14. A call admission control system as claimed in claim 13, wherein said assignment evaluation means comprises first comparing means for comparing (Vav+Vavt) and (Vt−Vpht) $\rho$max when said call is assigned with the average speed, and second comparing means for comparing (Vpht+Vp) and (Vt−Vavt) $\rho$max, where Vav is the average speed of the call which is requesting the call connection, Vavt is the sum of average speeds of all calls already assigned with average speeds, Vpht is the sum of peak speeds of all calls already assigned with peak speeds, Vp is the peak speed of the call which is requesting the call connection, and $\rho$max is the maximum utilization ratio of the transmission line, whereby when said band assignment determining means decides to assign the call with the average speed, said assignment evaluation means decides to admit the call only when the value (Vav+Vavt) is smaller than or equal to the value (Vt−Vpht) ρmax, and when said band assignment determining means decides to assign the call with the peak speed, said assignment evaluation means decides to admit the call only when the value (Vpht+Vp) is smaller than or equal to the value (Vt−Vavt) ρmax.

15. A call admission control system in an asynchronous transfer mode exchange which receives a description of parameters of traffic, upon reception of a call, through a transmission line to another subscriber terminal, comprising:
   a memory for storing a standard data speed in said transmission line, a sum of the peak speeds of all calls wherein the peak speeds are previously assigned in said transmission line, and a sum of the average speeds of all calls wherein the average speeds are previously assigned in said transmission line;
   calculating means for calculating, based on said description of parameters, an average and a dispersion of data speeds of the call which is requesting a call connection through said transmission line;
   band assignment determining means, operatively connected to said memory and to said calculating means, for determining whether said call with the average speed or said call with the peak speed is to be assigned, based on the calculated values of the average and the dispersion and values stored in said memory;
   assignment evaluation means, operatively connected to said band assignment determining means, for determining, in response to the assignment of the call, whether the assigned call is acceptable for being transferred; and
   said band assignment determining means comprising comparison means for comparing (Vt−Vpht) and X, where Vt is the regulated speed of the transmission line, Vpht is the sum of peak speeds of all calls already assigned with peak speeds, and X is the minimum number of calls possible to be assigned with average speeds, whereby when the value (Vt−Vpht) is larger than or equal to the value X, the call is assigned with the average speed, and when the value (Vt−Vpht) is smaller than the value X, the call is assigned with the peak speed.

16. A call admission control system in an asynchronous transfer mode exchange which receives a description of parameters of traffic, upon reception of a call from a subscriber terminal, requesting a connection through a transmission line to another subscriber terminal, comprising:
   estimating means for estimating the communication band width required by the calling subscriber, based on the parameters described by the calling subscriber, said estimating means further comprising:
      described parameter receiving means for receiving an average speed Vav and a peak speed Vp of the bandwidth of the calling subscriber,
      comparing means for comparing the ratio of the peak speed $W_{BT}$ of the transmission line and the peak speed Vp of the calling subscriber with a predetermined value X, where X is the minimum number of calls possible to be assigned with average speed, and
      average and dispersion estimating means, operatively connected to said comparing means, for estimating, when the comparison result is that the ratio $W_{BT}/Vp$ is smaller than said predetermined value X, an average E and a dispersion V of the data speed from the calling subscriber by the following equations:

$$E[Z] = Vp \times P_1 + 0 \times (1 - P_1) = Vp \times P_1 = Vav$$
$$V[Z] = (Vp - Vav)^2 \times P_1 + (0 - Vav)^2 \times (1 - P_1)$$
$$= Vav \times (Vp - Vav)$$

where $P_1$ is the probability of ON of the data from the subscriber terminal, and Z is the random variable of the data transmission speed;
   managing means for managing the amount of band width which is in use in the transmission line or the output route; and
   admission determining means, operatively connected to said estimating means and to said managing means, for determining whether or not the call should be admitted, under the condition that the call satisfies the communication quality, based on the band width estimated by said estimating means and the amount of band width which is used, as managed by said managing means.

17. A call admission control system in an asynchronous transfer mode exchange which receives a description of parameters of traffic, upon reception of a call from a subscriber terminal, requesting a connection, through a transmission line to another subscriber terminal, comprising:
   estimating means for estimating the communication band width required by the calling subscriber, based o the parameters described by the calling subscriber said estimating means further comprising:
      described parameter receiving means for receiving an average speed Vav and a peak speed Vp of the bandwidth of the calling subscriber,
      comparing means for comparing the ratio of the peak speed $W_{BT}$ of the transmission line and the peak speed Vp of the calling subscriber with a predetermined value X, where X is the minimum number of calls possible to be assigned with average speed, and
      average and dispersion estimating means, operatively connected to said comparing means, for estimating, when the comparison result is that the ratio $W_{BT}/Vp$ is smaller than said predetermined value X, an average $m_c$ and a dispersion $\sigma_c^2$ of the transmitting cells per unit time from the calling subscriber terminal by the following equations:

$$m_c = E[N] = E[Z/Cl] = E[Z]Cl = Vav/Cl$$

$$\sigma_c^2 = V[N] = V[Z/Cl] = V[Z]Cl^2 = Vav/(Vp - Vav)/Cl^2$$

where N is the random variable of the number of the transmitted cells, Cl is the cell length, and Z is the random variable of the data transmission speed;
   managing means for managing the amount of band width which is in use the transmission line or the output route; and
   admission determining means, operatively connected to said estimating means and to said managing means, for determining whether or not the call should be admitted, under the condition that the call satisfies the communication quality, based on the band width estimated by said estimating means and the amount of band width which is used, as managed by said managing means.

18. A call admission control system in an asynchronous transfer mode exchange which receives a description of parameters of traffic, upon reception of a call from a subscriber terminal, requesting a connection through a transmission line to another subscriber terminal, comprising:

estimating means for estimating the communication band width required by the calling subscriber, based on the parameters described by the calling subscriber;

managing means for managing the amount of band width which is in use in the transmission line or the output route; and admission determining means, operatively connected to said estimating means and to said managing means, for determining whether or not the call should be admitted, under the condition that the call satisfies the communication quality, based on the band width estimated by said estimating means and the amount of band width which is in use, as managed by said managing means; and said admission determining means employing the distribution of all communication speeds in the transmission line or the output route as a Gaussian distribution, and wherein the condition to satisfy the communication quality is the following condition:

$$m_B + PO_{CB} \leq W_{BT}$$

where $m_B$ is the average of all communicating speeds under communication, PO is the minimum value of P which satisfies the condition:

$$OVF_B \leq 1 - F_1(P)$$

where $OVF_B$ is the probability of the impossibility to enter the transmission line, and $F_1(P)$ is expressed as follows:

$$F_1(P) = \frac{1}{\sqrt{(2\pi)}} \int_{-\infty}^{P} \exp(-z^2/2) dz$$

19. A call admission control system in an asynchronous transfer mode exchange which receives a description of parameters of traffic, upon reception of a call from a subscriber terminal, requesting a connection through a transmission line to another subscriber terminal, comprising:

estimating means for estimating the communication band width required by the calling subscriber, based on the parameters described by the calling subscriber;

managing means for managing the amount of band width which is in use in the transmission line or the output route; and admission determining means, operatively connected to said estimating means and to said managing means, for determining whether or not the call should be admitted, under the condition that the call satisfies the communication quality, based on the band width estimated by said estimating means and the amount of band width which is in use, as managed by said managing means;

said admission determining means employing the distribution of all numbers of cells per unit time in the transmission line or in the output route as a Gaussian distribution, and wherein the condition to satisfy the communication quality is the following condition:

$$m_x + PO_{Cx} \leq S + M$$

where $m_x$ is the average of all cells generated during the communication, PO is the value which satisfies the condition:

$$ovfl = Lc = 1 - \phi(PO)$$

where Lc is the quality standard of the cell loss rate, and $\phi(P)$ is expressed as:

$$\phi(P) = \frac{1}{\sqrt{(2\pi)}} \int_{-\infty}^{P} \exp(-z^2/2) dz$$

20. The call admission control system as recited in claim 18, wherein said managing means manages the amount of data used in the bandwidth in accordance with the average and the dispersion of the communication speed.

21. The call admission control system as recited in claim 19, wherein the said managing means manages the amount of data used in the bandwidth in accordance with the average and the dispersion of the number of cells per unit time.

* * * * *

UNITED STATES PATENT AND TRADEMARK OFFICE
CERTIFICATE OF CORRECTION

PATENT NO. : 5,280,483
DATED : January 18, 1994
INVENTOR(S) : KAMOI et al.

It is certified that error appears in the above-indentified patent and that said Letters Patent is hereby corrected as shown below:

Col. 13, line 29, change "Communication" to --communication--.

Col. 17, line 51, after "Namely," insert --among--.

Col. 18, line 48, change "valve" to --value--;
line 65, change "o" to --for--;
line 66, after "ation" insert --,--.

Col. 19, line 41, change "or" to --for--;
line 42, change "a" (1st occurrence) to --$\underline{a}$-- and change "v" to --$\underline{V}$--.

Col. 22, line 28, change "th" to --the--.

* Col. 25, line 43, equation (208), after "dz" insert -- = 1-F($W_{BT}$)--;
line 51, change "conditions" to --condition--.

Col. 27, line 22, after "$10^{-9}$" insert --)--;
line 38, change "spews" to --speeds--.

Col. 29, line 46, after "for" insert --putting,-- and after "applying" insert --,--.

Col. 30, line 5, after "process" insert --,--.

Col. 31, line 28, change "," (first occurrence) to --;--;
line 61, before "i.e.," insert --(-- and after "permission" insert --)--.

UNITED STATES PATENT AND TRADEMARK OFFICE
CERTIFICATE OF CORRECTION

PATENT NO. : 5,280,483
DATED : January 18, 1994
INVENTOR(S) : KAMOI et al.

It is certified that error appears in the above-indentified patent and that said Letters Patent is hereby corrected as shown below:

Col. 32, line 34, change "output s" to --outputs--;
line 36, after "arrangement" insert --,--.

Col. 37, line 16, before "1-Vav/VP)" insert --(--.

* Col. 40, line 35, change "o" to --on--;
* line 65, after "use" insert --in--.

Signed and Sealed this

First Day of November, 1994

Attest:

BRUCE LEHMAN

Attesting Officer

Commissioner of Patents and Trademarks